United States Patent
Warfield et al.

(10) Patent No.: US 11,102,295 B2
(45) Date of Patent: Aug. 24, 2021

(54) METHODS, SYSTEMS AND DEVICES FOR PARALLEL NETWORK INTERFACE DATA STRUCTURES WITH DIFFERENTIAL DATA STORAGE AND PROCESSING SERVICE CAPABILITIES

(71) Applicant: OPEN INVENTION NETWORK LLC, Durham, NC (US)

(72) Inventors: Andrew Warfield, Vancouver (CA); Mihir Nanavati, Vancouver (CA)

(73) Assignee: Open Invention Network LLC, Durham, NC (US)

( * ) Notice: Subject to any disclaimer, the term of this patent is extended or adjusted under 35 U.S.C. 154(b) by 0 days.

(21) Appl. No.: 15/795,543

(22) Filed: Oct. 27, 2017

(65) Prior Publication Data

US 2018/0054485 A1   Feb. 22, 2018

Related U.S. Application Data

(63) Continuation of application No. 14/625,934, filed on Feb. 19, 2015, now abandoned.

(60) Provisional application No. 61/942,655, filed on Feb. 21, 2014.

(51) Int. Cl.
| | |
|---|---|
| *H04L 12/863* | (2013.01) |
| *H04L 12/861* | (2013.01) |
| *G06F 3/06* | (2006.01) |
| *H04L 29/08* | (2006.01) |

(52) U.S. Cl.
CPC ........ *H04L 67/1097* (2013.01); *G06F 3/0602* (2013.01); *G06F 3/067* (2013.01); *H04L 47/621* (2013.01); *H04L 47/6215* (2013.01); *H04L 47/6295* (2013.01); *H04L 49/90* (2013.01); *H04L 49/9078* (2013.01)

(58) Field of Classification Search
CPC .. G06F 3/06–2003/0698; H04L 47/621–6295; H04L 49/90–9094; H04L 67/1097
See application file for complete search history.

(56) References Cited

U.S. PATENT DOCUMENTS

| | | | | |
|---|---|---|---|---|
| 6,157,963 | A * | 12/2000 | Courtright, II | G06F 3/061 710/40 |
| 7,260,703 | B1 * | 8/2007 | Moore | G06F 3/0611 711/158 |
| 7,305,537 | B1 * | 12/2007 | Moore | G06F 3/0611 711/151 |
| 7,386,692 | B1 * | 6/2008 | Moore | G06F 3/061 711/158 |

(Continued)

*Primary Examiner* — David R Lazaro
*Assistant Examiner* — Julian Chang

(57) ABSTRACT

Systems, methods and devices relating to a network-accessible data storage device comprising a network interface in data communication with a network, the network interface for receiving and sending data units, the data units being assigned to at least one of a plurality of network data queues depending on at least one data unit characteristic; a data storage component communicatively coupled with the network interface, the data storage component comprising a plurality of data storage resources for receiving and responding to data transactions communicated in data units; and a queue mapping component for mapping each network data queues to at least one data storage resource for processing of data transactions.

13 Claims, 5 Drawing Sheets

(56) References Cited

U.S. PATENT DOCUMENTS

| | | | | |
|---|---|---|---|---|
| 7,490,179 B2* | 2/2009 | Neyama | G06F 3/0613 | 710/52 |
| 7,539,709 B1* | 5/2009 | Vengerov | G06F 17/30067 | |
| 7,606,934 B1* | 10/2009 | Vengerov | G06F 3/0611 | 706/21 |
| 7,631,023 B1* | 12/2009 | Kaiser | G06F 3/061 | |
| 7,826,467 B2* | 11/2010 | Bennett | H04L 47/522 | 370/412 |
| 8,006,111 B1* | 8/2011 | Faibish | G06F 1/3221 | 711/114 |
| 8,161,223 B1* | 4/2012 | Chamseddine | G06F 3/0613 | 710/310 |
| 8,285,961 B2* | 10/2012 | Sikdar | G06F 3/061 | 711/114 |
| 8,578,106 B1* | 11/2013 | Shapiro | G06F 3/061 | 711/119 |
| 8,595,385 B1* | 11/2013 | Shapiro | G06F 13/385 | 709/253 |
| 8,762,654 B1* | 6/2014 | Yang | G11C 7/22 | 365/185.03 |
| 8,819,309 B1* | 8/2014 | Bruce | G06F 13/385 | 710/11 |
| 8,832,234 B1* | 9/2014 | Brooker | G06F 17/30194 | 709/216 |
| 8,949,489 B1* | 2/2015 | Merchant | G06F 3/0659 | 710/36 |
| 10,169,948 B2 | 1/2019 | Fluman et al. | | |
| 2002/0013864 A1* | 1/2002 | Dandrea | G06F 3/0613 | 710/6 |
| 2003/0076849 A1* | 4/2003 | Morgan | H04L 12/4625 | 370/412 |
| 2005/0060558 A1* | 3/2005 | Hussain | G06F 9/5044 | 713/189 |
| 2005/0100035 A1* | 5/2005 | Chiou | H04L 45/24 | 370/412 |
| 2006/0112251 A1* | 5/2006 | Karr | G06F 3/061 | 711/170 |
| 2007/0130387 A1* | 6/2007 | Moore | G06F 13/20 | 710/40 |
| 2007/0168569 A1* | 7/2007 | Bonwick | G06F 3/0611 | 710/5 |
| 2007/0280277 A1* | 12/2007 | Lund | H04L 49/205 | 370/412 |
| 2009/0064149 A1* | 3/2009 | Singh | G06F 11/3447 | 718/101 |
| 2009/0125678 A1* | 5/2009 | Tokuda | G06F 3/0611 | 711/114 |
| 2009/0265519 A1* | 10/2009 | Moore | G06F 1/3221 | 711/162 |
| 2009/0287865 A1* | 11/2009 | Aidworth | G06F 13/1626 | 710/110 |
| 2010/0169570 A1* | 7/2010 | Mesnier | G06F 3/0605 | 711/114 |
| 2010/0262752 A1* | 10/2010 | Davis | G06F 3/0613 | 711/103 |
| 2011/0106904 A1* | 5/2011 | Resch | G06F 11/1076 | 709/207 |
| 2011/0179232 A1* | 7/2011 | Schindler | G06F 3/0613 | 711/154 |
| 2011/0289287 A1 | 11/2011 | Yamamoto et al. | | |
| 2011/0320649 A1* | 12/2011 | Leventhal | G06F 3/0613 | 710/39 |
| 2012/0155256 A1* | 6/2012 | Pope | G06F 13/128 | 370/230 |
| 2012/0159097 A1* | 6/2012 | Jennas, II | G06F 3/0611 | 711/162 |
| 2012/0278530 A1* | 11/2012 | Ebsen | G06F 3/0659 | 711/103 |
| 2012/0311113 A1* | 12/2012 | Nagata | G06F 3/061 | 709/221 |
| 2012/0324160 A1* | 12/2012 | Liu | G06F 3/0611 | 711/112 |
| 2013/0007757 A1 | 1/2013 | Chambliss et al. | | |
| 2013/0024615 A1* | 1/2013 | Cordelia | G06F 3/061 | 711/114 |
| 2013/0073702 A1* | 3/2013 | Umbehocker | G06F 9/5016 | 709/222 |
| 2013/0227201 A1* | 8/2013 | Talagala | G06F 12/0246 | 711/103 |
| 2013/0297907 A1* | 11/2013 | Ki | G06F 12/0684 | 711/170 |
| 2013/0315054 A1* | 11/2013 | Shamis | H04L 47/58 | 370/225 |
| 2013/0318134 A1* | 11/2013 | Bolik | G06F 17/30194 | 707/827 |
| 2013/0346688 A1* | 12/2013 | Hayakawa | G06F 3/0611 | 711/113 |
| 2014/0052694 A1* | 2/2014 | Dasari | G06F 11/1461 | 707/654 |
| 2014/0164676 A1* | 6/2014 | Borchers | G06F 12/0246 | 711/103 |
| 2014/0164677 A1* | 6/2014 | Borchers | G06F 3/0611 | 711/103 |
| 2014/0173113 A1* | 6/2014 | Vemuri | H04L 67/1097 | 709/226 |
| 2014/0281329 A1* | 9/2014 | McKean | G06F 3/0611 | 711/167 |
| 2014/0282824 A1 | 9/2014 | Lango et al. | | |
| 2015/0121020 A1* | 4/2015 | Bita | G06F 3/0613 | 711/158 |
| 2015/0134857 A1* | 5/2015 | Hahn | G06F 3/061 | 710/5 |
| 2015/0143053 A1* | 5/2015 | Quimbey | G06F 12/0855 | 711/133 |
| 2015/0169341 A1* | 6/2015 | Gulati | G06F 9/45533 | 718/1 |
| 2015/0201018 A1* | 7/2015 | Abram | H04L 67/1097 | 707/736 |
| 2015/0244804 A1* | 8/2015 | Warfield | H04L 47/6295 | 709/219 |
| 2016/0259568 A1* | 9/2016 | Grimsrud | G06F 3/0613 | |

\* cited by examiner

METHODS, SYSTEMS AND DEVICES FOR PARALLEL NETWORK INTERFACE DATA STRUCTURES WITH DIFFERENTIAL DATA STORAGE AND PROCESSING SERVICE CAPABILITIES

CROSS-REFERENCE TO RELATED APPLICATION

This application is a continuation of U.S. patent application Ser. No. 14/625,934, filed Feb. 19, 2015, which claims priority to U.S. Provisional Application No. 61/942,655, filed Feb. 21, 2014, the entire disclosures of which are incorporated herein by reference.

FIELD OF THE DISCLOSURE

The present disclosure relates to systems, methods and devices implementing network interface data structures with differential data storage service capabilities.

BACKGROUND

Among other drawbacks, enterprise storage targets are very expensive. They can often represent an estimated 40% of capital expenditures on a new virtualization deployment (the servers and software licenses combine to form another 25%), and are among the highest-margin components of capital expenditure in enterprise IT spending. Enterprise Storage Area Networks (SANs) and Network Attached Storage (NAS) devices, which are typically utilized as memory resources for distributed memory systems, are very expensive, representing probably the highest margin computer hardware available in a datacenter environment.

Some systems, such as Veritas™'s cluster volume manager (to name just one), attempt to mitigate this cost by consolidating multiple disks on a host and/or aggregating disks within a network to provide the appearance of a single storage target. While many such systems perform some degree of consolidating memory resources, they generally use simple, established techniques to unify a set of distributed memory resources into a single common pool. Put simply, these related systems strive for the simple goal of aggregating distributed resources into the illusion of a single homogenous resource.

Managing the storage of data (documents, databases, email, and system images such as operating system and application files) is generally a complex and fragmented problem in business environments today. While a large number of products exist to manage data storage, they tend to take piecewise solutions at individual points across many layers of software and hardware systems. The solutions presented by enterprise storage systems, block devices or entire file system name spaces, are generally too coarse grained to allow for the adequate management of data storage resources, particularly when the data characteristics or the storage resource characteristics are continually in flux over time.

The placement of data in many known systems is explicit. Conventional approaches to storage, such as RAID and the erasure coding techniques that are common in object storage systems involve an opaque statistical assignment that tries to evenly balance data across multiple devices. This approach is fine if you have large numbers of devices and data that is accessed very uniformly. It is less useful if, as in the case of PCIe flash, you are capable of building a very high-performance system with even a relatively small number of devices or if you have data that has severe hot spots on a subset of very popular data.

Storage systems have always involved a hierarchy of progressively faster media, and some techniques attempt to keep hot data in smaller, faster memories. In general, storage system design has approached faster media from the perspective that slow disks represent primary storage, and that any form of faster memory (frequently DRAM on the controller, but more recently also flash-based caching accelerator cards) should be treated as cache. As a result, the problem that these systems set out to solve is how to promote the hottest set of data into cache, and how to keep it there in the face of other, lower-frequency accesses. Because caches have historically been much smaller than the total volume of primary storage, this has been a reasonable tactic: it is impractical to keep everything in cache all the time, and so a good caching algorithm gets the most value out of caching the small, but hottest subset of data.

Storage may be considered to be increasingly both expensive and underutilized. PCIe flash memories are available from numerous hardware vendors and range in random access throughput from about 50K to about 1M Input/Output Operations per Second ("IOPS"). At 50K IOPS, a single flash device consumes 25W and has comparable random access throughput to an aggregate of 250 15K enterprise-class SAS hard disks that consume 10W each. In enterprise environments, the hardware cost and performance characteristics of these "Storage-Class Memories" associated with distributed environments may be problematic. Few applications produce sufficient continuous load as to entirely utilize a single device, and multiple devices must be combined to achieve redundancy. Unfortunately, the performance of these memories defies traditional "array" form factors, because, unlike spinning disks, even a single card is capable of saturating a 10 GB network interface, and may require significant CPU resources to operate at that speed. While promising results have been achieved in aggregating a distributed set of nonvolatile memories into distributed data structures, these systems have focused on specific workloads and interfaces, such as KV stores or shared logs, and assumed a single global domain of trust. Enterprise environments have multiple tenants and require support for legacy storage protocols such as iSCSI and NFS. The problem presented by aspects of storage class memory may be considered similar to that experienced with enterprise servers. Server hardware was often idle, and environments hosted large numbers of inflexible, unchangeable OS and application stacks. Hardware virtualization decoupled the entire software stack from the hardware that it ran on, allowing existing applications to more densely share physical resources, while also enabling entirely new software systems to be deployed alongside incumbent application stacks.

The emergence of commodity PCIe flash marks a remarkable shift in storage hardware, introducing a three-order-of-magnitude performance improvement over traditional mechanical disks in a single release cycle. PCIe flash provides a thousand times more random IOPS than mechanical disks (and 100 times more than SAS/SATA SSDs) at a fraction of the per-IOP cost and power consumption. However, its high per-capacity cost makes it unsuitable as a drop-in replacement for mechanical disks in all cases. Except for niche use cases, most storage consumers will require a hybrid system combining the high performance of flash with the cheap capacity of magnetic disks in order to optimize these balancing concerns. In such systems, the question of how to arrange data and performance guarantees across tiers is helpful in optimizing the requirements for wide sets of data.

Two of the most important performance characteristics of data operations are (1) throughput and (2) latency. Throughput is a measure of the number of operations that can be performed in a unit of time; generally measured in IOPS, or input/output operations per second. Throughput for flash is an order of magnitude larger than for spinning disks. Latency is the time to complete one operation, and is measured in time. For flash memory devices, exemplary latency values may be in the range of 10 µs to 100 µs; for spinning disks, exemplary latency is 10 ms to 100 ms. In general, however, flash is significantly more expensive and so for data operations that are not performance-sensitive, flash memory is probably not required. That said, even for flash only-memory, some data may be hotter than other data.

In general, throughput and latency are competing concerns. In order to ensure high throughput, most computing operations are processed in large batches so that many different operations can be completed concurrently or in rapid sequence. In contrast, latency is reduced by increasing resources for a particular operation; in some cases, by dedicating resources for a specific operation or type of operation. As such, dedicating resources to reduce latency often necessarily results in a decrease in throughput.

Developing new standards have resulted in direct-device parallel processing of data operations at the application-layer for data received or sent over a network by a network interface controller ("NIC"). As such, specific resources, such as a single core in a multi-core processor or a single processor in a multi-processor computing device can be dedicated to a high-priority queue that requires high performance, while preserving other resources for the data that is queued separately. In general, the NIC may divert data units received over a network that has a specific port and/or address associated with it. For example, data packets having a destination information as 1.1.1.1: port 90 will be directed to the high performance queue, while those having a destination information as 1.1.1.1: port 16 will be directed to the alternate queue. Similarly, data that is being transmitted over the network via the NIC can have parallel queues for data associated with higher performance requirements: the higher priority communication port will be reserved for data that is particularly performance sensitive.

In addition to multiqueue capabilities, newer underlying network device interfaces also permit incoming data streams to avoid the OS kernel for handling incoming data, which before now required the OS to determine destination and identity and then wrap the data in accordance with application-layer protocols (with every step requiring at least one write to cache memory). For example, Intel™'s Data Plane Development Kit ("DPDK") implementations are capable of skipping the entire OS layer and, with the assistance of the NIC (which may in some cases virtualize network interfaces and then isolate data inputs—by, for example, sending all data with a specific IP or MAC address to a particular virtual NIC that is dedicated for a specific queue), receiving data packets, determining transmission information, and then placing back into the appropriate queue for transmission back to or on to the appropriate destination. Specific queues can be dedicated for specific resources; this, among other benefits, can preserve both high throughput for some queues and low-latency for other queues for data transmission (whose dedicated resources are waiting for packets) for handling incoming network traffic as either a destination or an intermediary.

This background information is provided to reveal information believed by the applicant to be of possible relevance. No admission is necessarily intended, nor should be construed, that any of the preceding information constitutes prior art.

SUMMARY

The following presents a simplified summary of the general inventive concept(s) described herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

A need exists for systems, methods and devices for methods, systems and devices for parallel network interface data structures with differential data storage service capabilities that overcome some of the drawbacks of known techniques, or at least, provide a useful alternative thereto. Some aspects of this disclosure provide examples of such methods, systems and devices.

For example, among other benefits, there is provided herein various devices, methods, software architectures and systems for associating data that requires different data storage processing performance with specific data storage resources that are capable of or dedicated to provide such services, including through the use of parallel network processing.

In accordance with one aspect, there is provided a network-accessible data storage device comprising a network interface in data communication with a network, the network interface for receiving and sending data units, the data units being assigned to at least one of a plurality of network data queues depending on at least one data unit characteristic; a data storage component communicatively coupled with the network interface, the data storage component comprising a plurality of data storage resources for receiving and responding to data transactions communicated in data units; and a queue mapping component for mapping each network data queues to at least one data storage resource for processing of data transactions.

In accordance with another aspect there is provided a computer-readable memory having instructions thereon that cause a computer processing unit, when carrying out the instructions, to map communicatively coupled network data queues with one or more communicatively coupled data storage resources on a data storage component, the network data queues being populated with data units depending on at least one data unit characteristic, the data units being communicated over a communications network via a network interface component that is communicatively coupled to the computer processing unit, the data storage resources being responsive to data transactions carried by data units.

In accordance with another aspect there is provided a method for mapping network data queues with a plurality of data storage resources, each network data queue being populated with data units received and sent by at least one network interface port over a communication network, each network interface port being associated with at least one data network queue by a computer processor depending on at least one data unit characteristic of the data units, the method comprising determining a first operational characteristic of at least one data storage resource related to a service requirement criteria of a first network data queue; determining if the first operational characteristic is within a first operational threshold required for the service requirement criteria of the first network data queue, and if so, mapping the first network data queue to the at least one data storage resource; and repeating both determining steps until all data storage resources have been mapped to the network data queues.

In accordance with another aspect there is provided a network-accessible data storage system for processing data transactions received over the network, the system comprising a communication interface to the network; one or more data storage devices configured to respond to the data transactions received via said communication interface, said one or more data storage devices providing at least two data storage resources distinctly designated to accommodate respective data processing characteristics; and a resource allocation engine operatively associated with said communication interface to receive as input a given data processing characteristic automatically identifiable from each of the data transactions and allocate a designated one of said data storage resources according to said given data processing characteristic in responding to each of the data transactions. Optionally, the network-accessible data storage communicates data transactions via a selected one of multiple network data queues designated as a function of said respective data processing characteristics such that said given data processing characteristic is at least partially identifiable from said selected one of said multiple network data queues. Also optionally, the communication interface of the network-accessible data storage system defines distinct communication ports, wherein each of the data transactions is received via a designated one of said ports, and wherein said given data processing characteristic is at least partially identifiable from said designated port.

In accordance with another aspect there is provided a computer-readable memory having instructions stored thereon that cause a computer processing unit, when carrying out the instructions, to automatically identify a data processing characteristic associated with a data transaction request received over a communication network, and allocate a designated data storage resource from multiple available data storage resources to said data transaction request according to said data processing characteristic to have said data transaction request processed via said designated data storage resource in accordance with said identified data processing characteristic.

Other aspects, features and/or advantages will become more apparent upon reading of the following non-restrictive description of specific embodiments thereof, given by way of example only with reference to the accompanying drawings.

BRIEF DESCRIPTION OF THE FIGURES

The invention, both as to its arrangement and method of operation, together with further aspects and advantages thereof, as would be understood by a person skilled in the art of the instant invention, may be best understood and otherwise become apparent by reference to the accompanying schematic and graphical representations in light of the brief but detailed description hereafter.

DETAILED DESCRIPTION

Figure 1:
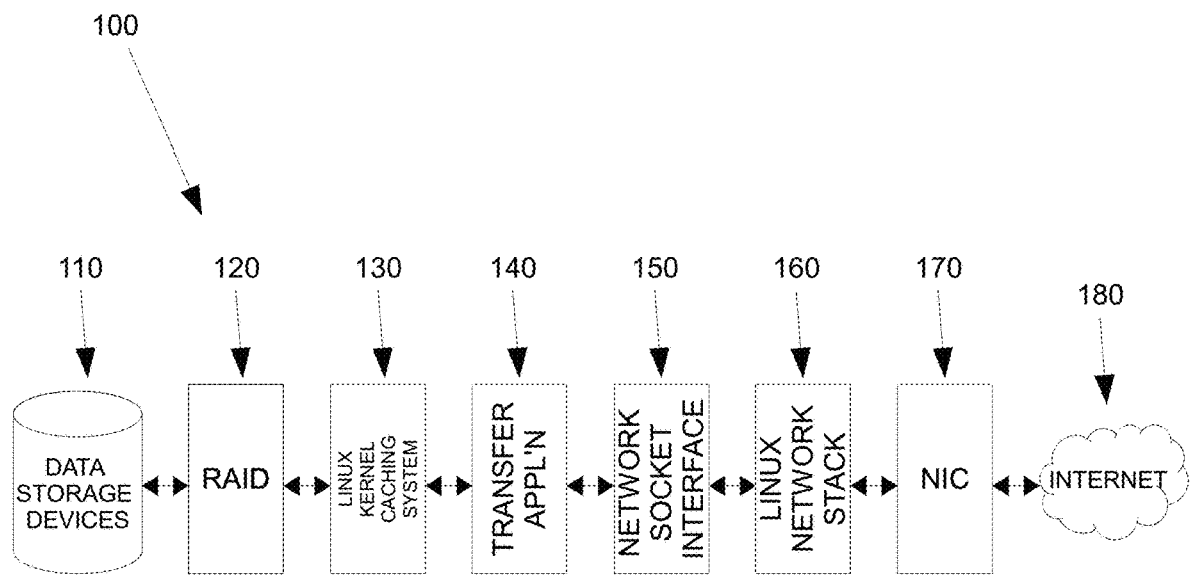
FIG. 1 is a diagram representative of a prior art network-accessible data storage device.

The present invention will now be described more fully with reference to the accompanying schematic and graphical representations in which representative embodiments of the present invention are shown. The invention may however be embodied and applied and used in different forms and should not be construed as being limited to the exemplary embodiments set forth herein. Rather, these embodiments are provided so that this application will be understood in illustration and brief explanation in order to convey the true scope of the invention to those skilled in the art.

Aspects disclosed herein may leverage certain developments relating to improved mechanisms for treating data transmissions received and sent over a network by a network node; such developments have permitted two important capabilities for the treatment of network data transmission. The first of these relate to the ability for direct interaction and/or control from user-space or application-layer interaction with network interfaces (and bypassing the OS kernel and OS network stack), and the second relates to a capability of such application-layer or user-space control to manage incoming data by, among other things, placing such data into queues and then associating the queues with the most appropriate and sometimes dedicated resources for network processing. For example, Intel™'s Data Plane Development Kit ("DPDK") provides for direct access between the network interface controller ("NIC") and user-space, whereby DPDK provides for various functionalities, including a cache memory manager (to allocate distinct pools of objects across a plurality of DRAM channels), a buffer manager (for pre-allocating and prospective de-allocating of buffer space in object pools); a queue manager (for implementing and managing queues, in cases, safe and/or lockless queues, of incoming data streams allowing different components to process data units such as, for example, data packets or segments); a flow classifier (for efficient placement of data units into data flows quickly for processing); and poll mode drivers (for polling-based implementation avoiding interrupt processing). See for example, Intel™'s DPDK, and other data plane network-based communications modules, each of which may comprise software-architectures, libraries or other methodologies. Such data plane network-based communications modules, among other things, manage data packet processing and provide an interface between user-space for managing packetized data streams received by a connected NIC; this avoids the OS kernel networking stack thus reducing performance overhead associated therewith (e.g. network socket interfaces, Linux network stack, and Linux disk caching). In addition to the reduced overhead by permitting the application-layer to directly access the NIC is that more customized management of packetized data and data streams can be implemented; this includes the ability to divert data packets (or other units of data, depending on the abstraction layer) appropriately, including by dedicating specific resources to certain data queues. Certain developments have also enabled the use of data plane-based software-architectures for associating the direct-device mapped properties on both the network interface side and the data storage side (see, e.g., "Big Data Technologies for Ultra-High-Speed Data Transfer and Processing: Using Technologies from Aspera and Intel to Achieve 40 Gbps WAN/LAN Transfer Speed", White Paper Intel™ Xeon™ Processor E5 Family, Aspera Inc., 2013, incorporated herein by reference). Utilizing such direct-device mappings, a number of operational or service-level capabilities can be achieved above and beyond bypassing and/or reducing infrastructural overhead, including for example that ability to associate network data queues with specific data storage resources thereby associating specific service level criteria or requirements achievable by different data storage resources with specific incoming and outgoing network data streams.

Aspects herein may be configured to associate network queues for data streams that have been received via a NIC with varying service-levels, capabilities, and/or priorities, including for example, latency requirements and/or throughput requirements, and then associating such network data queues in the application-layer with specific data storage resources that will meet or exceed such service-levels, capabilities and/or priorities with respect to the data storage requirements of received data. The data storage resources may include one or more different types of media that offer varying levels of service, specific data storage queues relating to one or more such storage devices, or data storage queues that are associated with performance criteria for one or more storage devices. Some aspects may be configured to associate data transactions received or for transmission over a network via a NIC with network data queues based on characteristics of the data requests (including, for example, origin, priority, destination, payload information, header information, destination or source IP address, MAC address or port, or other characteristic relating to the data requests therein). As such, data transactions which may have specific operational requirements, such as low-latency requirements or high-throughput, may be identified dynamically or otherwise and then placed in a data network queue associated with that specific operational requirement; the data network queues may be dynamically or otherwise associated with data storage resources that increase the ability to provide such operational requirements by the storage media, through setting aside dedicated resources, associating storage resources whose performance meets or exceeds the operational requirements required of the data, providing for hierarchical processing associated with specific queues (i.e. causing a given storage device to stop processing data transactions associated with a first data storage queue and process data transactions associated with a second data storage queue when that second data storage queue becomes populated above a threshold level), or a combination thereof.

In general, network interfaces for services made available to clients over a network are accessible via a common network addressable point (e.g. an IP address or a set of IP addresses). Behind the interface, multiple services may be provided but which are accessible, from the perspective of a client, as an integrated service. For example, many Software-as-a-Service implementations provide a common web interface at one or more web servers for the provision of what appears to be an integrated service, but are in fact a variety of services each maintained discretely on different servers or VMs behind said web server. For example, many online shopping services may have a "shopping cart" application server (or set thereof), a database server (or set thereof), a recommendations application server (of set thereof), or an identification/authentication server (or set thereof). Operation of these services have been focused on an interoperability basis, while modern data storage architectures have more focused on efficient load balancing of specific functions. Using the online shopping service, a scalable and high traffic online shopping service will often feature an HTTP load balancer which will, based on some static quality of the network traffic, distribute processing load across multiple VMs that all provide a shopping cart functionality. A more nuanced manner of establishing efficient and dedicated data paths from network interface, including processing resources, to data storage, based on different and dynamically changing qualities relating to the data and/or the networking, processing and resources, is required rather than the static manner of load balancing that has been used in the past.

Two important qualities for data storage architectures include density and utilization. Important objectives for maximizing these qualities and thus maximizing performance include (1) to facilitate the direct access of data to where the data resides as closely as possible and (2) to manage placement to achieve density and utilization as data storage capacities and data clients scale. Competing with these goals are the historical architectures described above; that is, a single or small number of network interface points, which distribute data storage operations across distributed resources, often in a static fashion.

The instant disclosure provides for mapping one or more of a number network interface queues, one or more of a number of data processing resources (e.g. a CPU core), and one or more of a number of data storage queues (e.g. a data storage queue associated with one or more distributed storage resources, or a storage resource itself). Since each of the network interface, processing resources, and data storage queues provide various direct paths, which can be mapped for specific data associated with any of a number of different characteristics.

Even data processing within a CPU that is restricted to data forwarding, a CPU can easily get saturated as a single path for data. This is exacerbated when or if the CPU is also carrying out some level of data processing (such as the following non-limiting examples: indexing, encrypting/decrypting, transcoding) for some or all of the data that is part of a mixed data stack. In addition, partitioning of data storage (or other application layer data processing) is required when multiple data storage resources in a distributed data storage system may be implementing storage functions—or the same data on the same data storage resource is being used by multiple data clients. By dedicating a specific data path (across two or more of network interface, data processing resources, and data storage resources) to an identifiable portion of a data stack, the dedicated storage resource can be established to avoid the need for partitioning, or indeed other data integrity measures that must be imposed when using distributed storage. As opposed to addressing data communications merely to an endpoint or a host on a network, behind which can sit myriad devices and services, or even the data itself (including information about where it resides within a distributed data storage system), the data can be addressed to a specific data path within the distributed data storage system. As such, data can be addressable to a dedicated set of networking, processing, and data storage resources depending on information associated with the addressing information of the data or any other characteristic of the data. In cases where the addressing information of the data is utilized, it is possible to embed information into an IP address of a packet that may be used to determine the assigned or associated data path. In any case, the information associated with a given packet (or indeed any protocol data unit, e.g. frame, segment, etc.) may be used to assign the packet or a portion of its payload to different data paths on a sub-packet (or, as the case may be, sub-PDU) basis.

With reference to FIG. 1, there is shown the prior art implementation of network enabled storage devices that shows how packetized data is typically handled 100. As the high-level diagram shows, both preparing packets for transmission over, and handling packets received over, the Internet involves a series of steps, each involving memory copies at least one processing step if not more, typically in cache memory. Very high-speed transfers and memory- and CPU-intensive operations (e.g., at the Linux* kernel socket interface) provide a significant impediment to fully using the network bandwidth available on modern architectures. As performance requirements for data storage increases to the point where processing at data storage is increasingly no longer a bottleneck for data transactions, the overhead associated with typical processing by and through the OS kernel represents a significant drain on network-enabled storage devices. In FIG. 1, the data storage resources 110 comprise of multiple data storage media components (not shown) which are handled by RAID methodologies 110 to distribute capacity and resources evenly across the storage media components. This information is processed by the OS kernel prior to processing 120 at the application layer 130, passed through processing to enable network socket interfacing 150, and passed again through the OS kernel networking stack 160, through the network interface hardware (in this case a NIC 170) prior to communication over a network (in this case, the Internet 180).

Figure 2:
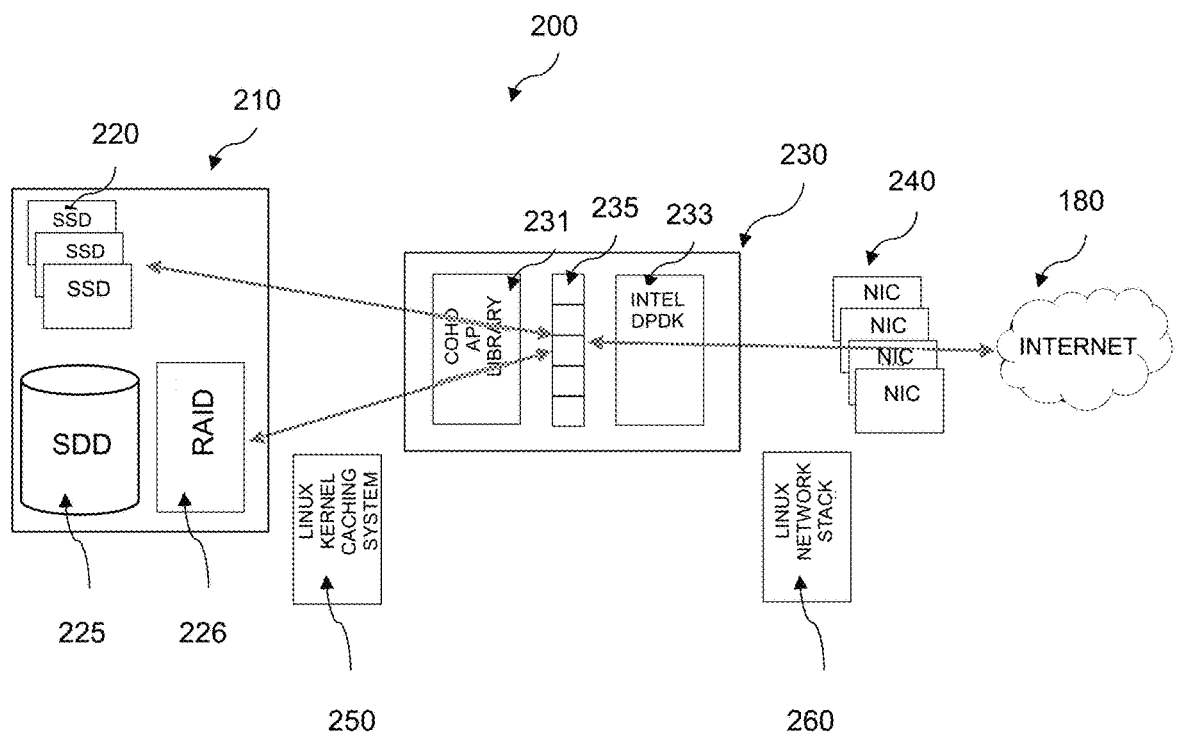
FIG. 2 is a diagram representative of a network-accessible data storage device in accordance with one embodiment.

With reference to FIG. 2, some embodiments of the herein disclosed subject matter provide a software architecture for direct-device access by the application-layer at user space 200, thus providing for reduced overhead that would otherwise be necessitated by OS kernel handing and caching. In the exemplary embodiment shown, a combination of Intel™'s DPDK driver library 235 and Coho™ application programming interface software 231 provide in a resource allocation engine 230 direct-device access to both the network interface hardware 240 as well the data storage component 210. Moreover, the resource allocation engine 230 is configured to generate network data queues by allocating data units (e.g. packets, segments, or other protocol data units from different OSI model layers) into network data queues 235 as logical data structures, wherein each data units in a given network data queue shares a data processing characteristic. The data processing characteristic will be indicative of service level criteria that may be required for all such data units for processing by the data storage component 210, including for example a need for low latency or high throughput. Since some data processing characteristics may be competing in nature, the processing of such data units can, in the instant application, be handled in isolation. At the resource allocation engine 230, Intel™'s DPDK driver library 235 and Coho™ application programming interface software 231, operate together to allocate specific network data queues with specific data storage resources at the data storage component 210. In FIG. 2, there are shown a plurality of SSDs 220, as well as an array of spinning disk drives 225 which is managed by a RAID software layer 226 for distributing resources of the array of spinning disks 225, including data transaction queues or other virtualized data storage resources. The resource allocation engine 230 is further configured to allocate the data network queues directly to specific data storage resources, including both (i) data storage media components (e.g. SSD 220, spinning disks 226), as well as (ii) virtualized media components or other abstract or logical data constructs using such data storage media components like data transaction queues or VMs. In direct-device embodiments, the processing overhead that results from processing and caching at the OS kernel (on both the network and data storage sides 250, 260) is bypassed and handled by the Intel™'s DPDK driver library 235 and Coho™ application programming interface software 231 during processing at the resource allocation engine 230.

Figure 3:
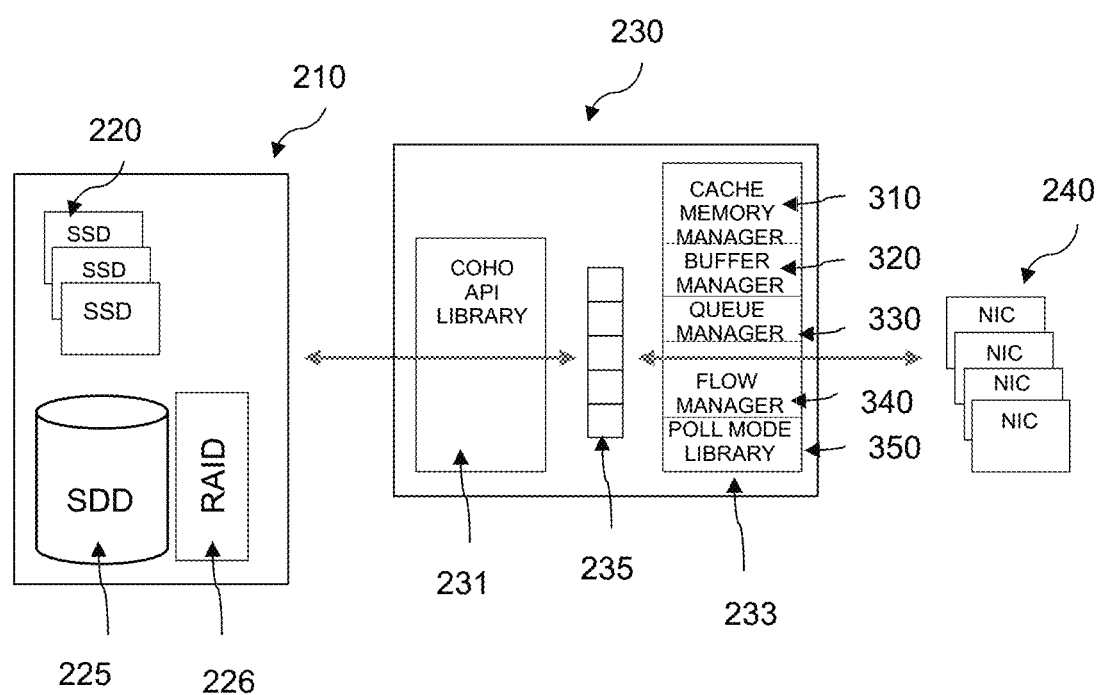
FIG. 3 is a diagram representative of a resource allocation engine in communication with a network interface component and a data storage component in accordance with another embodiment.

With reference to FIG. 3, there is shown an exemplary resource allocation engine 230, comprising an application space implemented using Intel™'s DPDK driver library 235 and Coho™ application programming interface software 231 to allocate the network data queues 235 with data storage resources in the data storage component 210. In the example shown, the data storage component 210 comprises a number of different types of data storage resources, including a plurality of SSDs 220 and a RAID-implemented array of spinning disks 225, 226. As shown in this example, the Intel™ DPDK driver library includes a number of different functionalities: a cache memory management element 310, a buffer management element 320, a queue management element 330, a flow management element 340, and a poll mode library element 350. Among other things, these respectively provide for allocation of distinct pools of objects across a plurality of DRAM channels in cache memory by the cache memory management element 310, pre-allocation and prospective de-allocation of buffer space in object pools by the buffer management element 320; implementing and managing queues of both inbound and outbound data streams by the queue management element 330; efficient placement of data units into data flows quickly for processing by the a flow management element 340; and polling-based implementation for efficient processing of data units, both inbound data units (polls for newly arrived data units) and outbound data units (polls for available resources) by the poll mode library element 350. Among other functionalities, the COHO™ application program interface 231 (and associated libraries) may in some embodiments provide for determining which network data queue a particular data unit should be placed in, generation of associations or mappings between network data queues and data storage resources that have the appropriate process characteristics to meet specific service level criteria associated with data transactions in a given network data queue, determining which data storage resources are available and what are the performance characteristics of such data storage resources, and generating data storage resources in the case where such data storage resources are logical or virtual data constructs (such as data transaction queues).

Some aspects of the herein disclosed subject matter may provide for storage devices with a network interface permitting multiple and parallel queues of data units for processing; an application layer module that maps network data queues to (a) specific computing processor resources and (b) specific data storage resources; and a data storage component having multiple data storage resources, such resources comprising storage media components (e.g. flash-based devices, spinning disk), data transaction queues (e.g. queues of data requests that are associated with specific storage media), or software tools that present aggregated data as virtual storage components and/or queues.

In other aspects, there are provided application-layer components that map connections between network data queues and data storage resources (e.g. specific media devices, data transaction queues, applications that manage storage resources such as RAID, or virtualized storage devices or data constructs). Such mappings permit data comprising data packets that may be associated with specific operational requirements or characteristics to be placed in data network queues that can be mapped directly to specific data storage resources (including specific data storage devices, data storage device types, or data storage queues holding data transactions related to such data storage devices).

In yet other aspects, there are provided methods for mapping connections between data network queues and data storage components (which may include specific data storage media components and transaction queues thereof, or virtualized/logical data structures relating thereto), the mapped data storage components having performance characteristics capable of providing a service level criteria for the processing of data transactions requests. In some cases, the mapping may be static wherein all data that is associated with a pre-determined characteristic, such as the destination port, IP address or MAC address, gets placed into a specific data network queue which is statically associated with a specific data storage device or group of data storage devices. In other cases, the association between the network data queues and the data storage resources may be dynamic, wherein the associations can change over time; for example, if there is a subset of data storage that has been associated for a specific data (which is either stored there or the subset has been designated for storing such data), and the priority of that data may change over time, the mappings may be managed dynamically to cause data transactions relating to such network data queues to be associated with a lower-latency service level criteria during times when that data (as well as any temporally related data) has high priority, and for such mappings to revert to a more throughput-oriented queue, which may or may be shared with other data transactions, during times when the priority of that data is reduced. In yet other cases, the associations between data characteristics and network data queues may be managed dynamically; for example, data characteristics that indicate a temporal relationship between data units, for example relating to when such data units may have higher or lower priority at similar times, those data units may be dynamically diverted into a network data queue that can be associated with one or more data storage resources that can provide the appropriate performance characteristics for such related data units during times of high or low priority (including latency or throughput requirements).

In some aspects, the characteristics for determining in which data network queues that specific data transactions should be placed are static and/or pre-determined. In other words, a data client may send all data transactions with high priority (or other specific service level requirement) to a specific port, since the data client has been notified that such port will be designated for such service level requirements. In other cases, the application-layer component may be configured to detect characteristics that are determinative of which queue any given data unit should be diverted; in such cases, there may be information contained in a data unit header or pseudo-header, or even in the payload, which may indicate or be associated with a particular service level requirement. Such information may, in some embodiments, be stored and analyzed over time to realize or generate such indications or associations.

In some aspects, there are provided data storage devices comprising a network interface with one or more network interface ports and having data communication with a plurality of network data queues, the network interface ports are configured for sending and receiving data units over a network, data units being assigned to at least one of the network data queues depending on at least one data unit characteristic; a data storage component communicatively coupled with the network interface, the data storage component comprising a plurality of data storage resources for receiving and responding to data transactions; and a queue mapping component for mapping network data queues with at least one data storage resource for processing of data units comprising data relating to data transactions.

In general, the data storage devices comprise a network interface that is configured to provide a communicative coupling of the devices to a communications network. The communications network may comprise the Internet, but other communication networks may be utilized for transmission of data transactions without departing from the scope and nature of the instantly disclosed subject matter. The communications networks may include LANs, WANs, and other types of networks.

In some embodiments, the network interface may comprise of one or more network interface controllers, each such controller having one or more communication ports. The network interface may also in some aspects comprise of virtual network interface controllers and ports, wherein one or more physical network interface controllers present one more virtual network interfaces thus facilitating load distribution and isolation of communications over one or more NICs. Using a data plane network-based communications module, such as Intel™'s DPDK, incoming and outgoing data transactions (including data requests and responses thereto) can be distributed across multiple network data queues at the application-layer depending on certain characteristics of each data transaction. Each network data queue may be processed at application-layer in accordance with certain operational requirements associated therewith; for example, specific network data queues may be designated to ensure low-latency by associated such queues with dedicated resources that will be used for fewer or no other functions, or they may be designated for high-throughput by allowing the queue to become saturated with data units for processing such that no data storage resources associated with such high-throughput network data queues are ever idle since there are always data transactions available. It is possible to associate other operational requirements with network data queues, including storage related operational requirements (including latency, throughput, security, fast-path to specific resources, redundancy, reliability by associating with data storage resources having low failure rates, integrity from multiply-accessible data objects, and others which may be known to persons skilled in the art), wherein different data storage resources can provide differing levels of service level criteria for each such storage related operational requirements.

In addition to associating each network data queue with particular resources to achieve operational requirements relating to data packet processing, each network data queue can be associated with specific data storage resources, each such data storage resource providing storage-related operational benefits. The data storage device additionally comprises a data storage component which comprises a plurality of data storage resources. A data storage resource may comprise a specific data storage media component, such as an SSD, disk drive, or other type of data storage media device, or it may comprise of a data storage transaction queues that have been associated for processing by one or more data storage media component. In addition, each such data storage media component may be a virtual, physical, or an aggregation of one or more data storage media components. By associating data storage resources at the application-layer of the data storage device, data transactions that are received or sent by the data storage device over the network can be associated with the data storage resource that is most suitable to facilitate the achievement of a data storage operational requirement for that data transaction. Some embodiments of the data storage device is also configured to statically and/or dynamically determine the operational requirements for any given data transaction and then placing that data transaction in the appropriate data network data queue for achieving that operational requirement. Some embodiments are also able to statically and/or dynamically link network data queues with one or more data storage resources that will facilitate the achievement of an operational objective associated with the data transactions carried by data units in a given network data queue.

In some embodiments, there may be provided a data storage device that comprises a communications interface that provides an interface for the device to a communications network comprising one or more network interface controllers. In some cases, the data storage device defines one or more network ports to provide a communicative coupling to an external network; in some cases, however, a port may comprise a virtual port through one or more physical ports emulating a port. In some embodiments, the network enabled storage device may be a direct device-mapped device wherein the network interface controller is directly controlled from user space and which permits the bypassing of the OS layer (e.g. Linux kernel and Linux caching) by data units which would otherwise require processing and caching by the OS kernel, as well as network socket processing in the OS networking stack. In some embodiments, the direct-device access to the NIC from user space is provided by the Intel™'s DPDK, although other software drivers and data plane libraries are possible.

In some embodiments, the network interface comprises a network interface controller, or NIC. In general, a network interface provides the interface between network and the data storage device. A network interface may comprise one or more physical NICs, such as for example, an Intel 82574L Gigabit Ethernet NIC may be used. One or more physical NICs may also be used to emulate one or more virtualized NICs, which can among other things provide for efficient data packet processing and isolation. The network interface defines one or more ports, which may be individually addressed or identified according to various network protocols. In some cases, the port is a physical connector for connecting data communication conduits. In some cases, a port may be understood as software construct serving as a communications endpoint in a computer's host operating system, and may be application-specific or process-specific. A port may be associated with an IP address of the network interface, or NIC, as well as with the type of protocol used for communication.

A network data queue may be considered as an abstract data construct or collection in which entities in the queue, in this case, data units that may comprise data transactions, are maintained while waiting to be processed; the operations on the collection of entities include the addition of entities to the queue, known as enqueue, and removal of entities from queue, known as dequeue. In some cases, a FIFO data structure may be used wherein new entities added to the queue are placed at the back of the queue and entities to be removed are dequeued or removed from the front of the queue. In such queues, after a new element is added, all elements that were added before have to be removed before the new element can be removed. A FIFO queue is an example of a linear queue. Other non-linear queues may be implemented, wherein the removal from the queue may be determined by criteria other than the order of its placement in the queue, and may be determined in part by the priority or other characteristics of the data unit.

The data storage component comprises one or more data storage media components and may include such storage media as disk drives, flash drives, optical drives, SSDs, other flash-based memory, PCM (Phase change memory), or other types of media devices that are configured to receive, store and make available data. The data storage component may receive data transactions, which comprise data units that carry instructions and in some cases storage location information; in the case of a write request, the data transaction may also carry a payload of information to be storage at the data storage component, and the case of a read request, the data transaction may not carry any data as payload. The instructions and storage location may indicate how and where the data should be stored in the data storage component, or the data storage component may in some embodiments perform this function. In some cases, a data storage resource may refer to a specific data storage media component or a group thereof, or it may refer to a data transaction queue, or other abstract data construct of a data storage media component relating to queued data transactions; such data queue or other data construct may provide isolated resources and/or capacity from one or more data storage media components with the one or more of the network data queues. As such, a specific data storage media component may have a plurality of queues associated therewith wherein processing of any data that is in each queue may be treated differently but still on specific data storage media component. In such cases, the data storage resources that are associable with the network data queues may include a data storage media component (e.g. a SSD or a spinning disk drive) or a data queue thereof. For example, a low-latency or fastpath queue may be given priority over a throughput-oriented queue whenever data units are placed in the fastpath queue or the number of data units in that queue have exceeded a predetermined threshold.

In some embodiments, each data storage resource can be characterized according to one or more operational characteristics. In general, these may relate to the performance characteristics of the data storage resource, such as latency, throughput, network distance, capacity, processing speed, integrity, security, or any other performance characteristics that may be associated with a storage resource.

In some embodiments, the queue-mapping component operates in the application-layer, or in user-space, and is configured to assign network data queues with data storage resources. The assignment of network data queues with specific data storage resources may be done in accordance with a user-defined setting (e.g. a queue of data units from a specific port shall be assigned to specific processing resources and also to a specific low-latency and dedicated storage resource); in other cases, the assignment may be in accordance with characteristics of the data units in a particular network data queue that indicate the nature of the storage capabilities required which can then be used to determine which data storage resources should be assigned. This assignment may be dynamic as the data characteristics and operational characteristics and performance of the data storage resources change over time. As for other embodiments, some data characteristics may include source IP address, destination IP address, source port, destination port, packet header information, data priority (e.g. hotness/coldness), and a combination thereof.

In some embodiments, data storage media components comprising spinning disks may be aggregated and presented as isolated logical structures such as data storage queues. The data queues may be supported by one or more dedicated spinning disks and distributed across a plurality of spinning disks in accordance with RAID methodologies, or other storage virtualization.

In some embodiments, certain classes of data transactions may be characterized as having one or more service requirement criteria. A service requirement criteria may, for example, be a requirement that data transactions meet a latency requirement, or have a lower latency than data transactions of other classes; meet a throughput requirement, or have a higher throughput that data transactions of other classes; or other service requirements. Whether a data transaction is part of a class of data transactions that has a specific service requirement criteria, may in some embodiments be identified by the data characteristics of that data transaction. In a simple case, a port or group of ports may be designated as being a fastpath for some data transactions, and as such, any data transactions that require extremely low latency (e.g. a data transaction that relates to a financial transaction) may be transmitted to that port. In other cases, other characteristics may be assessed dynamically to determine if the data transaction is part of a class having a specific service requirement criteria. In some embodiments, there may be a variety of service requirement criteria that can be characterized in a number of different ways. For example, a class of data transactions may require a specific service quality requirement (which may include but not be limited to latency and throughput and a combination thereof) and/or a service type requirement (which may including by not be limited to encryption, translation, integrity checking, and others, as well as combinations thereof). In some embodiments, the service requirement criteria may be presented as service level guarantees for one or more operational benefits. In such cases, data storage resources may be dedicated to data transactions that require one or more service level guarantees and, to the extent that there are insufficient data storage resources that have the necessary performance requirements, the resource allocation engine may cause additional data storage resources to be dedicated or prioritized for the data transactions that are associated with service level guarantees. This may occur dynamically or a notification may be presented to an administrator who can then select additional data storage resources to be dedicated or prioritized. While dedicated resources are used exclusively for the class of data transactions for which they have been dedicated, prioritized data storage resources may be used for other lower priority classes of data transactions when the higher priority classes of data transactions are not present and/or about to be received.

In some embodiments, there are service requirement thresholds that apply to service quality requirements. In some cases, these may include upper and lower service requirement thresholds, where the upper threshold represents a threshold above which additional data storage resources may be provided (i.e. dedicated or prioritized), and where the lower threshold represents a threshold where some of the data storage resources that have been dedicated or prioritized may be used by other classes of data transactions that do not have service quality requirements (or have lower service quality requirements). The value of the service requirement thresholds may be determined over time by collecting and analyzing the data in a data collection and storage module (which comprises a communicatively coupled memory device). An administrator, using such data that shows which and how many data storage resources need to be dedicated or prioritized to meet a service quality requirement or guarantee, may set the upper and lower thresholds accordingly; alternatively, the resource allocation engine may automatically and dynamically determine optimal upper and lower thresholds and maintain them to ensure that data transactions are processed according to the service level requirements or service quality requirements.

In some embodiments, the service requirement types, such as encryption, translation, integrity checking, and others, there may be additional processing steps applied to specific data transactions that are received over specific network data queues that are associated with specific data storage resources. For example, if additional encryption or other security is required for a class of data transactions, these data transactions may be associated with a data storage resource that is associated with a (i) a process for encryption and (ii) a secure data storage media component. In some cases, the data associated with the data transaction (either returned by a response to a read request or communicated by a write request) may be encrypted using, for example using a hash function or other function that incorporates information from the storage location indicator (i.e. address). In such cases, the hash function processing may be associated with a specific network data queue. While an encryption process has been described above for illustrative purposes, other processes may be utilized by specific classes of data transactions that may have service requirement types associated therewith, particularly when some classes of data transactions may have service requirement types that are different than other classes.

In some embodiments, there is provided a resource allocation engine in user-space or the application-layer for managing and associating specific network data queues with specific data storage resources. The resource allocation engine is configured, using in some exemplary embodiments DPDK, to directly control the NIC and the ports thereon and directly receive and process data units therefrom; the received data packets can be allocated into network data queues, such queues being processed by dedicated processing resources (i.e. a single core of a multi-core processor can be dedicated for a specific network data queue) and then associated with specific data storage resources. The resource allocation engine is also configured to directly control and directly receive from/transmit to the data storage resources in a way that bypasses on the data storage side the OS kernel including the OS kernel caching system. The data units, which depending on characteristics associated therewith, are assigned to specific network data queues by the resource allocation engine. In some embodiments, the resource allocation engine may create network data queues and then manage the processing of such queues. Depending on service requirement criteria for data units in those network data queues, the network data queues will be associated with specific data storage resources, and optionally, specific processing resources at the resource allocation engine.

In some embodiments, the resource allocation engine is implemented on a general purpose computer having a computer processing unit and access to a computer-readable memory having instructions thereon that cause the computer processing unit, when carrying out the instructions, to map communicatively coupled network data queues with one or more communicatively coupled data storage resources on a data storage component, the network data queues being populated with data units that are communicated over a communications network via network interface ports that are associated with such network data queues by the computer processing unit, the data storage resources being responsive to data transactions carried by data units communicated to such data storage resources by the network data queue mapped thereto by the computer processing unit.

In other embodiments, the resource allocation engine is implemented on a general purpose computer having a computer processing unit and access to a computer-readable memory having instructions stored thereon that cause the computer processing unit, when carrying out the instructions, to automatically identify a data processing characteristic associated with a data transaction request received over a communication network, and allocate a designated data storage resource from multiple available data storage resources to said data transaction request according to said data processing characteristic to have said data transaction request processed via said designated data storage resource in accordance with said identified data processing characteristic.

In some cases, the received and transmitted data units may not all be related to or carrying data transactions in their payload that are associated with data stored or intended to be stored at the data storage component, but rather data units that are being communicated over the network to another network node or endpoint, and the data storage device is an intermediary for that data unit. In such cases, the resource allocation engine will process the data for communication over the network to another network node or endpoint in accordance with known data transmission protocols.

In some embodiments, the resource allocation engine may comprise a plurality of processing resources; these may include, but are not limited to a plurality of processors, either or both physical or virtual, and/or one or more multi-core processors. Other processing resources may be possible, such as the use of multiple computing devices, including virtual machines, provided that processing resources may be combined to distribute processing workloads. Each processing resource assignable to one or more of the plurality of network data queues. A processing resource may be assigned to different network data queues wherein each processing resource prioritizes processing workload from different queues; in cases, this may mean that a network data queue, which is prioritized for low-latency service levels, may have a dedicated processing resource when it is populated by a number of data units higher than a threshold amount, but such resources is operative to process other queues having lower prioritization when the number of data units is below or equal to such threshold.

In some embodiments there is provided a method for mapping network data queues with a plurality of data storage resources. In some exemplary methods, each network data queue, which may in some embodiments be generated by the resource allocation engine, is populated with data units received on and/or sent by network interface ports on the network interface component over a communication network. Each network interface port is associated with at least one data network queue by a computer processor in the resource allocation engine depending on at least one data unit characteristic of the data units; in some embodiments, this is facilitated by direct-device access by the resource allocation engine which bypasses the OS kernel and any associating caching requirements, thus permitting direct application-level processing of the data units received and sent by the network interface component (as may be provided by, for example, the DPDK driver library). The steps of the method comprise, in some embodiments, determining a first operational characteristic of at least one data storage resource related to a service requirement criteria associated with a first network data queue. The operational characteristic will be indicative of the ability of that data storage resource to meet the service requirement criteria, or to exceed the ability of other data storage resources to meet the service requirement criteria. The method also includes the step of determining whether the first operational characteristics is not exceeding or less than (as the case may be) a first operational threshold required for the service requirement criteria of the first network data queue; in other words, whether the operational characteristics of a given data storage resource are such that it is capable of providing performance to the service requirement criteria required by the data transactions in the first network data queue (or in some cases better than other data storage resources). This may include that a given data storage resource has the necessary latency or throughput that is required by the class of data transactions associated with the network data queue in which they have been allocated. The method also comprises the step of mapping the first network data queue to the at least one data storage resource so that the network data queue will be provided storage services (i.e. read/write requests and responses thereto) by the appropriate data storage resource. The method may optionally include repeating both determining steps until all data storage resources have been mapped to network data queues.

Figure 4:
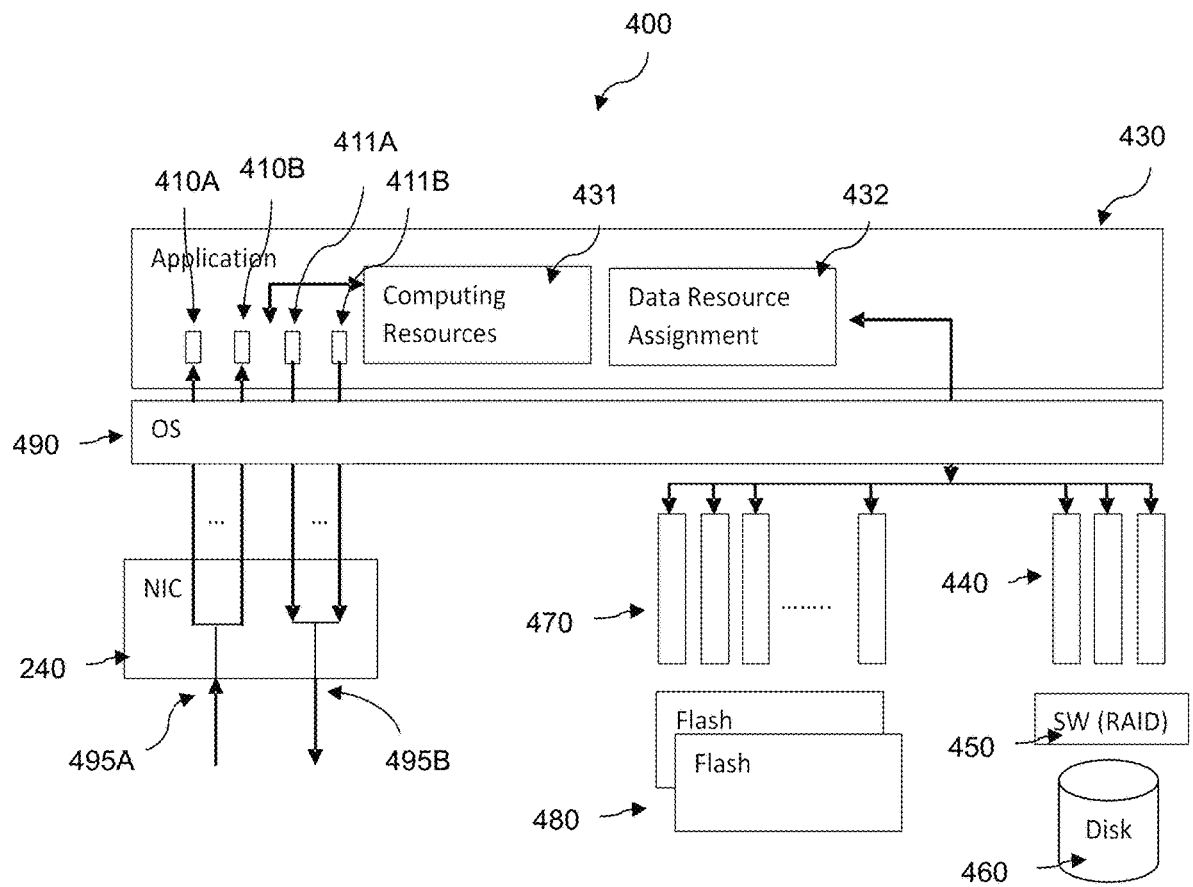
FIG. 4 is a diagram representative of a network-accessible data storage system in accordance with another embodiment.

With reference to FIG. 4, there is shown an exemplary network-accessible data storage system. There is shown a network interface component 240, which shows network data streams of inbound data units 495A and outbound data units 495B, which may be sent or received over a single or multiple ports. The NIC 240 in this exemplary embodiment sends data units from specific ports to specific network data queues 410A, 410B directly at the application layer 430 (and bypassing entirely the OS kernel 490) so as to be capable of permitting the system to treat data units in different network data queues in an isolated and differentiated fashion. At the application layer, data units from specific queues may be have computing resources 431 designated or allocated specifically for given network data queues. For example, a first processor core in a multi-core processor may be designated for a first network data queue, while the remaining cores are used for all other network data queues. There is a data storage resource assignment functionality in the queue mapping component 432 that assigns network data queues to specific data storage resources; this facilitates the appropriate treatment of specific network data queues with data storage resources that have the necessary performance characteristics to meet the specific service level requirements associated with data units in each given network data queue. The exemplary embodiment in FIG. 3 shows that the application layer 430 is configured to provide direct-device access to the data storage component (here shown as a combination of flash-based drives 480 and RAID-enabled array of spinning disks 450, 460, as well as data transaction queues 440, 470 associated with each data storage media component or type thereof).

Figure 5:
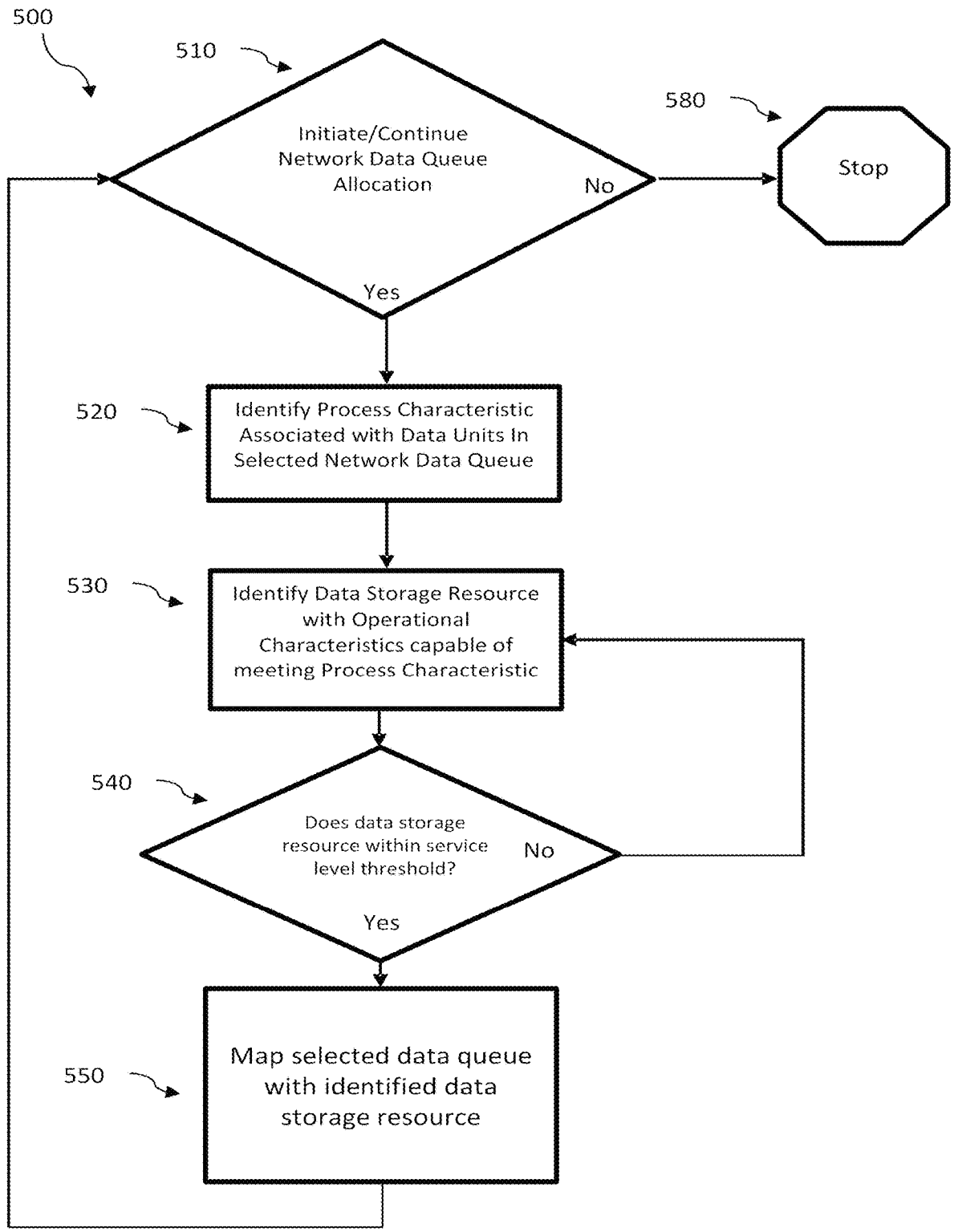
FIG. 5 is a block diagram representative of a method disclosed herein in accordance with one embodiment.

With reference to FIG. 5, there is shown a block diagram showing the steps of one method in accordance with one embodiment 500. In some embodiments, the method may be initiated by optionally determining 510 whether or not there is a class of data transactions in a given network data queue that are within acceptable service level thresholds. If all network data queues are operating in accordance with required service level criteria, the process may end 580. If network data queue allocation should be implemented, because for example a service level criteria is below a first operational threshold and above a second operational threshold, the method comprises the step of identifying 520 the process characteristics associated with data units (which may carry data transactions or portions thereof as the payload of such data unit) of a given network data queue. The method also comprises the step of identifying 530 from a plurality of data storage resources those data storage resources which have the necessary operational characteristics (e.g. performance, capacity, availability, etc.) to maintain the service requirement criteria of the data transactions. The method includes an assessment 540 of whether the identified data storage resource can maintain the processing of the data transactions at the data storage resources within service requirement criteria thresholds; if not, a further data storage resource is identified, but if so, the identified network data queue is mapped 550 to the identified data storage resource. In some embodiments, the process is optionally repeated for all network data queues 510.

In some embodiments, a network-accessible data storage system for processing data transactions received over the network, the system comprising a communication interface to the network. In some embodiments, the communication interface comprises a network interface cards with one or more network ports. The network-accessible data storage system also comprises one or more data storage devices configured to respond to the data transactions received via said communication interface, said one or more data storage devices providing at least two data storage resources distinctly designated to accommodate respective data processing characteristics. The data storage devices may comprise one or more data storage media components; for example, the data storage device may comprise one or more spinning disks, one or more SSDs (or other flash-based media components), or a combination thereof. Furthermore, each data storage media component may present one or more data transaction queues for processing data transactions, or data transactions queues may be shared across a plurality of data storage media components. In some cases, one or more data storage media components may be virtualized into one or more virtual data storage resources (which may present to the network data queues as any type of data storage resource). The network-accessible data storage system further comprises a resource allocation engine operatively associated with said communication interface to receive as input a given data processing characteristic automatically identifiable from each of the data transactions and allocate a designated one of said data storage resources according to said given data processing characteristic in responding to each of the data transactions. In exemplary embodiments, the resource allocation engine allocates the data storage resources dynamically (in particular, when the data processing characteristics or service requirement criteria change over time, or relates to an aspect of data transactions or a class of data transactions which may have a temporal quality, such as data priority which changes temporally).

In some embodiments, the network-accessible data storage system communicates data transactions via a selected one of multiple network data queues designated as a function of said respective data processing characteristics such that said given data processing characteristic is at least partially identifiable from said selected one of said multiple network data queues. In such cases, the data storage system utilizes a network data queue for data units communicated over a network (either when processing received data units or prior to sending data units); data units which relate to data transactions which have a shared data processing characteristic (i.e. destination IP address or port, source IP address or port, header information, payload information, or other data characteristics) may be communicated via a specific network data queue; the network data queue may be associated with specific data storage resources to facilitate processing of the data transaction in accordance with a service requirement criteria, including a data processing characteristic.

In some embodiments, the communication interface of the network-accessible data storage system defines distinct communication ports, wherein each of the data transactions is received via a designated one of said ports, and wherein said given data processing characteristic is at least partially identifiable from said designated port. As such, certain ports may be designated as having a super-priority over other ports in that in addition to having specific data storage resources types with higher performance (e.g. SSD for certain types of data transactions), and/or a specific group of such data storage resources may be dedicated entirely for data transactions received in data units to such designated ports. In some embodiments, the data storage resources may comprise at least two distinct data storage device types; in some cases, each distinct data storage device type may have varying performance capabilities, capacity or cost. As such, specific classes of data transactions, which are identifiable as belonging to such class by being communicated via a common network data queue, may be processed by data storage device type. In some embodiments, the data storage resources may comprise at least two distinct storage data processing queues associated with at least one data storage device.

In some embodiments, the network-accessible data storage system may process data transactions in accordance with their data processing characteristics wherein such data processing characteristics comprise a data processing priority characteristic. The data processing priority characteristic may include data processing latency and data processing throughput, or both. In an exemplary embodiment, a network data queue may comprise data transactions that should be processed below a specific data processing latency threshold, while another network data queue may comprise data transactions that should be processed above a specific throughput threshold. Since these are often competing performance goals, specific data storage resources can be allocated to each network data queue, thus ensuring that data transactions from each network data queue can be processed optimally and in accordance with the data processing priority characteristics specifically required by the data transactions in each network data queue.

In some embodiments, the network-accessible data storage system implements a resource allocation engine that has direct-device access to the network interface and bypasses the operating system kernel and operating system kernel caching, and handles processing of the data units directly by the application in user space.

In some aspects, a network data queue may be a data structure to handle data units that are received as part of a data stream of data units for processing; in general, the number of data units in a given queue will increase when the rate of receiving into the processing unit (e.g. the network interface controller, a CPU, a data storage resource, etc.) is not the same as the rate of processing by that unit. The data structure forms a buffer of data units for processing so that, in some cases, data can continue being received even if it is not processed immediately and/or there remains a continuous pool of data units to draw on for processing even if the processor is processing faster than data units are being received. In some cases, the data structure may be a single fixed-size buffer, a FIFO or LIFO (or other similar buffer known to persons skilled in the art), ring or circular buffer (e.g. as would handle a producer-consumer problem, wherein the producer would represent received data units and the consumer would represent processed units). In some cases, the processing of units may simply be the continued communication of the data unit in question (as would be the case wherein the data storage device is acting as a communication node and not the communication end-point, or if the data storage device cannot or should not respond to the data transaction associated with the data unit).

The network interface, in some embodiments, can be accessed directly by applications in the data storage device using the Intel® Data Plane Development Kit (Intel® DPDK). This makes it possible for the application-space to directly control the network interface controller (NIC), thereby bypassing the operating system kernel networking stack. This integration allows applications at user space to reduce the packet processing bottleneck for single-stream transfers, minimizing CPU, memory, and I/O bottlenecks. This eliminates the multiple data copies in the kernel networking stack and through user space, which conventional system architecture and traditional socket programming require. In addition, the DPDK software tools, which in some embodiments can be utilized with bare metal or fully virtualized network interfaces (such as SRIOV), have queue and buffer management components that permit data units (e.g. data packets) to be processed at the user layer, bypassing the kernel layer; moreover, the application can dedicate specific computing processing resources specifically for processing data units that are in particular data network queues. A data path for data having certain characteristics can thus be directed to specific data queues, which may have dedicated processing resources reserved therefor. Such resources may therefore have lower throughput (as they may remain idle at times) but with extremely low latency; on the other hand, different network queues may concurrently have access to other dedicated resources that ensure a higher throughput (but not necessarily such low latency). This provides a fast path for certain data (although, it may be termed a faster path since all data is directly handled at the user-level and skips the kernel layer). The characteristics for determining which network data queue may be extrinsic properties of the data unit, such the IP address or port to which the data unit is addressed, the port upon which the data unit is received or to be sent over (for TX data units). In other cases, the data unit characteristic may be intrinsic properties, such as information contained in a data unit header information, or the payload data.

In some embodiments, the application layer may employ deep packet inspection methodologies that assess information relating to the data in the data unit payload to assess characteristics of the data relating to the data transactions being communicated by the units (e.g. the priority or the hotness/coldness of the data). In this way, the data unit can be directed to the most appropriate data network queue by assessing the content of the data relating to the data transaction. In some cases, where a data stream relating to associated data transactions or responses are carried in multiple and possibly out-of-order data units or sub-units (for example, but not limited to TCP data units in IP packets), the resource allocation engine may inspect the contents of the payload, retain the information in local memory and the reconstruct all or portions of specific data transactions in order to determine the characteristics for placement in the most appropriate network data queue.

In general, the DPDK methodologies have been directed at quickly determining what action to process with a given received packet and then either (i) processing and transmitting the packet; or (ii) just transmitting to the correct endpoint or another node on the network or aggregated data storage network. The data storage technology described herein is configured to generate multiple queues of data transactions and assign transactions across such transaction queues, and process such transaction queues, in a parallel and/or programmable fashion. Embodiments of the instant disclosure provide devices and interfaces that provide configurable data paths between specific network interfaces and/or network data queues and the data storage queues. In some embodiments, there are multiple data resources, wherein a data path can be established between each resource and any one or more network data queue; in embodiments, there are multiple data resources with one or more of them having multiple queues, wherein datapaths can be established between any one or more network data queues and any one or more network resource and/or queue thereon. The datapaths that get established between network data queues and the data transaction queues provide customizable service and/or quality of service for certain classes of data by ensuring that such classes of data are associated with the most appropriate data storage resource to handle such data transactions, whether such resource is a particular type of storage media (e.g. flash for high priority data, or spinning disk for low priority data, or a virtualized storage target that may itself be virtualized from a single storage type or hybridized storage media) or a data transaction queue that has been associated with a set of storage media (e.g. one or more queues having a dedicated storage media or portions thereof, wherein some of the flash components, or a subset thereof, have been dedicated for a specific data transaction queue). For example, one or more data transaction queues may be dedicated to high-performance flash memory resources and, as such, network data queues that received data units pertaining to data requests from a pre-determined source (or to a specific network interface port, from a specific user/client, contain data in the packet payload that is known to be high priority data, or other such data advertisement) are directly associated with the dedicated data transaction queues; such dedicated data transaction queues are in some cases on standby to serve data requests that arrive from the specified network data queues.

In some embodiments, the data storage resources are also directly accessible by the application- or user-level; in the same way that network data traffic bypasses the OS kernel and is handled directly at the application layer, the data storage resources may in some embodiments also be handled in an analogous manner, thus reducing the overhead associated with the additional processing by the OS, including creating cached copies of data units in the kernel space. The direct access of data storage components to user space is described more fully in "Big Data Technologies for Ultra-High-Speed Data Transfer and Processing" Intel, 2013 (which is incorporated by reference herein). In embodiments, the data storage resources were incorporated into a system using Intel DPDK to bypass the kernel networking stack, reading data directly from storage resources into designated memory (i.e. the plurality of data network queues) that is directly accessible for transmission over the network interface. This eliminates the multiple data copies in the kernel networking stack and through user space, which conventional system architecture and traditional socket programming require.

In other cases, a plurality of additional data storage resources may include may comprise a single medium or unit, or it may be different types of resources that are combined logically or physically. The may include data storage media components that provide rapid and/or temporary data storage, such as RAM (Random Access Memory), SRAM (Static Random Access Memory), DRAM (Dynamic Random Access Memory), SDRAM (Synchronous Dynamic Random Access Memory), CAM (Content-Addressable Memory), or other rapid-access memory, or more longer-term data storage that may or may not provide for rapid access, use and/or storage, such as a disk drive, flash drive, optical drive, SSD, other flash-based memory, PCM (Phase change memory), or equivalent. A data storage media components may include, in whole or in part, volatile memory devices, non-volatile memory devices, or both volatile and non-volatile memory devices acting in concert. Other forms of memory, irrespective of whether such memory technology was available at the time of filing, may be used without departing from the spirit or scope of the instant disclosure. For example, any high-throughput and low-latency storage medium can be used in the same manner as PCIe Flash, including any solid-state memory technologies that will appear on the PCIe bus. Technologies including phase-change memory (PCM), spin-torque transfer (STT) and others will more fully develop. Some storage resources can be characterized as being high- or low-latency and/or high- or low-throughput and/or high- or low-capacity; in many embodiments, these characterizations are based on a relative comparison to other available storage resources on the same data server or within the same distributed storage system. For example, in a data server that comprises one or more PCIe Flash as well as one or more spinning disks, the PCIe flash will, relative to other storage resources, be considered as being lower latency and higher throughput, and the spinning disks will be considered as being higher latency and higher throughput. Higher or lower capacity depends on the specific capacity of each of the available storage resources, although in embodiments described herein, the form factor of a PCIe flash module is of lower capacity than a similarly sized form factor of a spinning disk.

In some embodiments, the data structures that are made available by the data storage resource media as a logical interface may be considered a data storage resource. For example, if a single or aggregated plurality of flash memory storage devices present one or more data transaction queues for handling data requests, such data transaction queues are considered herein to be data storage resources. Similarly, a virtualized data storage resource, such as a virtual machine that presents as data storage resource, may also be considered herein to be a data storage resource.

In embodiments, there is provided an application layer interface that concurrently achieves low-latency and high-throughput datapaths between the network interface and the data storage resources in a data storage component. The application layer interface may be a software application that exists as a set of instructions that are stored on a computer readable memory that, when implemented, cause a processor to map data network queues with specific data storage resources; specific network data queues will be reserved for a particular class of data, such as data units that are sent over a specific network interface port, from or to a specific data client, or data units having a priority above a predetermined or dynamically determined threshold (in embodiments with deep packet inspection capabilities incoming and outgoing data can be assessed for priority by inspecting payload information; for outgoing data, the data storage component and/or the application layer interface may be configured to determine priority depending on assessed data properties; or such priority may be advertised by the data client).

In embodiments, there are provided devices having a network interface component, an application layer interface, and a data storage component; the network interface components provide for a plurality of data queues, each of which may be associated with one of a plurality of data storage resources via an assignable data path by the application layer interface. The device comprises a computer processing component for mapping the association between data network queues at the network interface component and the data storage resources, including data storage media components (or groups thereof) as well as data transaction queues associated with such components. In embodiments, the hardware of the device comprises two Intel® Ethernet Converged Network Adapters X520-DA2 (dual port, 10G NIC with four ports total; as part of the network interface component), an Intel® Xeon® processor E5-2650 v2 (eight cores at 2.6 GHz with hyperthreading; wherein each core may be assigned specifically to one or more data transaction queues associated with the network interface), a 128-GB DDR3-1333 ECC (16×8 GB DIMM; each of which also assignable in embodiments to one or more data transaction queues); twelve Intel® SATA Solid-State Drives (800 GB, 6 Gb/s, 2.5" MLC per server; in the data storage component), two Intel® Integrated RAID Modules RMS25PB080 (PCIe2×8 with direct attachment to disk). In this example, the RAID modules provide for allocating queued resources in data transaction queues, wherein each of such data transaction queues for each can be associated directly with different data network queues depending the required service guarantees therefor. In other embodiments, the data storage component may also comprise a hybridized environment in that in addition to the solid-state drives, there are spinning disk drives, also managed by RAID, and/or one or more PCIe flash drives. Data transaction queues associated with any of these can be directly mapped to the network data queues of the network interface components depending on the required service guarantees.

In embodiments, flash storage devices may be utilized with SAS and SATA buses (~600 MB/s), PCIe bus (~32 GB/s), which supports performance-critical hardware like network interfaces and GPUs, or other types of communication system that transfers data between components inside a computer, or between computers. In some embodiments, PCIe flash devices provide significant price, cost, and performance tradeoffs as compared to spinning disks. The table below shows typical data storage resources used in some exemplary data servers.

|  | Capacity | Throughput | Latency | Power | Cost |
| --- | --- | --- | --- | --- | --- |
| 15K RPM Disk | 3 TB | 200 IOPS | 10 ms | 10 W | $ 200 |
| PCIe Flash | 800 GB | 50,000 IOPS | 10 µs | 25 W | $3000 |

In embodiments, PCIe flash is about one thousand times lower latency than spinning disks and about 250 times faster on a throughput basis. This performance density means that data stored in flash can serve workloads less expensively (16× cheaper by IOPS) and with less power (100× fewer Watts by IOPS). As a result, environments that have any performance sensitivity at all should be incorporating PCIe flash into their storage hierarchies. In embodiments, specific clusters of data are migrated to PCIe flash resources at times when these data clusters have high priority; in embodiments, data clusters having lower priority at specific times are migrated to the spinning disks. In embodiments, cost-effectiveness of distributed data systems can be maximized by either of these activities, or a combination thereof.

In embodiments, PCIe flash is about one thousand times lower latency than spinning disks and about 250 times faster on a throughput basis. This performance density means that data stored in flash can serve workloads less expensively (16× cheaper by IOPS) and with less power (100× fewer Watts by IOPS). As a result, environments that have any performance sensitivity at all should be incorporating PCIe flash into their storage hierarchies. In embodiments, data units that relate to high priority data, which requires a low-latency service guarantee, are associated with network data queues that are mapped to data transaction queues for reserved or dedicated PCIe flash resources that are maintained with relatively low workloads (in some embodiments, the priority of the data can be assessed dynamically based on a number of data characteristics and the mappings between the network data queues and the data storage resources can be remapped in accordance therewith); in embodiments, data units having lower priority at specific times are placed in network data queues that are mapped to flash with heavier workloads and/or to spinning disks. In embodiments, cost-effectiveness of distributed data systems can be maximized by either of these activities, or a combination thereof. In such cases, a distributed storage system may cause a write request involving high priority (i.e. "hot") data to be directed to available storage resources having a high performance capability, such as reserved or dedicated flash memory; in other cases, data transactions related to data which has low priority (i.e. "cold") is directed to lower performance storage resources. In both cases, the system is capable of cooperatively diverting the communication to the most appropriate storage node(s) to handle the data for each scenario.

In embodiments, there are provided devices comprising a network interface having a multiple queue facility for assigning specific data streams to specific network data queues, each of which are assigned to specific computing resources, and an application layer for assigning specific queues to specific data storage resources, and a data storage component having one of the following: at least one data storage component with multiple data request queues, multiple storage components, and a combination thereof.

In embodiments, there are provided methods for mapping associations between the network data queues and the data storage resources; in such embodiments, data storage resources are assessed according to their ability to meet or approach service-level requirements and such resources may be grouped together as a means of ensuring such service levels. Network data queues are created such that specific queues are associated, or mapped, with the data transaction queues that best meet those service guarantees. The network interface component then associates the network interface ports with the network data queues such that data units that are either received or are to be sent are placed in the network data queue that will provide the service requirement criteria for that data unit.

In some embodiments, data paths may not be static with respect to a given set or type of data unit, and different sub-paths or even associated paths may be assigned to certain sets of data. For example, as one or more of the resources associated with the data path become over-saturated, additional sub-paths can be generated. For example, and with reference to FIG. 6, as data path 660 is consuming a certain amount of processing resources, perhaps because it is performing journaling and/or transcoding to the data passing therethrough, processing becomes a bottleneck in the data path and thus slowing the connection for the class of data unit associated therewith. As such, the system of the instant embodiment may provide for sub-paths that are an alternative or additional connection associated with the same class of data unit (or sub-class thereof); with reference again to FIG. 6, data path 670 now provides for an additional or alternative route for the data units passing through data path 660 that passes some of the data units to a data path for the processing step and the data storage resource (thereby providing additional dedicated processing resources in a sub-path). The data units that travel over the sub-path 670 may be an arbitrary set of data units, or alternatively the data storage system may assign a sub-class of such class of data units depending on data characteristics thereof and/or the operational characteristics of the resources associated with the data path 660 and/or the sub-path 670. In the previous example, there are data paths in both directions (e.g. data paths for data requests and data responses therefrom, in the case of a distributed data system; for client requests and responses thereto in the case of other types of computing or application-level services). In accordance with other embodiments herein, there is provided a direct fast-path from the network interface and the processing resources, as well as a fast-path between the data processing resources and the data storage resources.

In other cases, there may be an efficient scheduling of adjacent activity (where adjacency can be considered in both time and space). For example, if different classes of data units share certain data characteristics (e.g. the same level of priority at the same time) but have different operational requirements (e.g. one class requires significant amount of processing, such as transcoding, whereas the other the other class is simply data forwarding), the system may assign adjacent paths or sub-paths and/or the same sub-path so that the same or similar data storage resources are assigned to both classes, while different processing resources may be assigned for the different classes. The possible combinations of assignment of data paths and sub-paths to multiple classes of data units is not limited to the example described above, which was for illustrative purposes. Any combination of the various networking, processing, and storage resources may be assigned to any one or more classes of data units, including the same or adjacent or similarly provisioned (i.e. similar operational characteristics and performance) for two or more classes of data units. Another example may include data paths that include requirements for similar data storage resources and therefore share the same data paths (or have different data paths but which direct data traffic to and from the same data storage resource); for example, the applicable data traffic streams may originate from different clients, but they may have similar priorities and/or uses and therefore the applicable data storage will likely utilize the same tier of storage, and may even be more likely to be stored contiguously and/or on the same physical media. In such an example, the entire data path may be shared between such streams, or sub-paths for the data storage resources and another component (i.e. networking and processing) may be shared.

Figure 6:
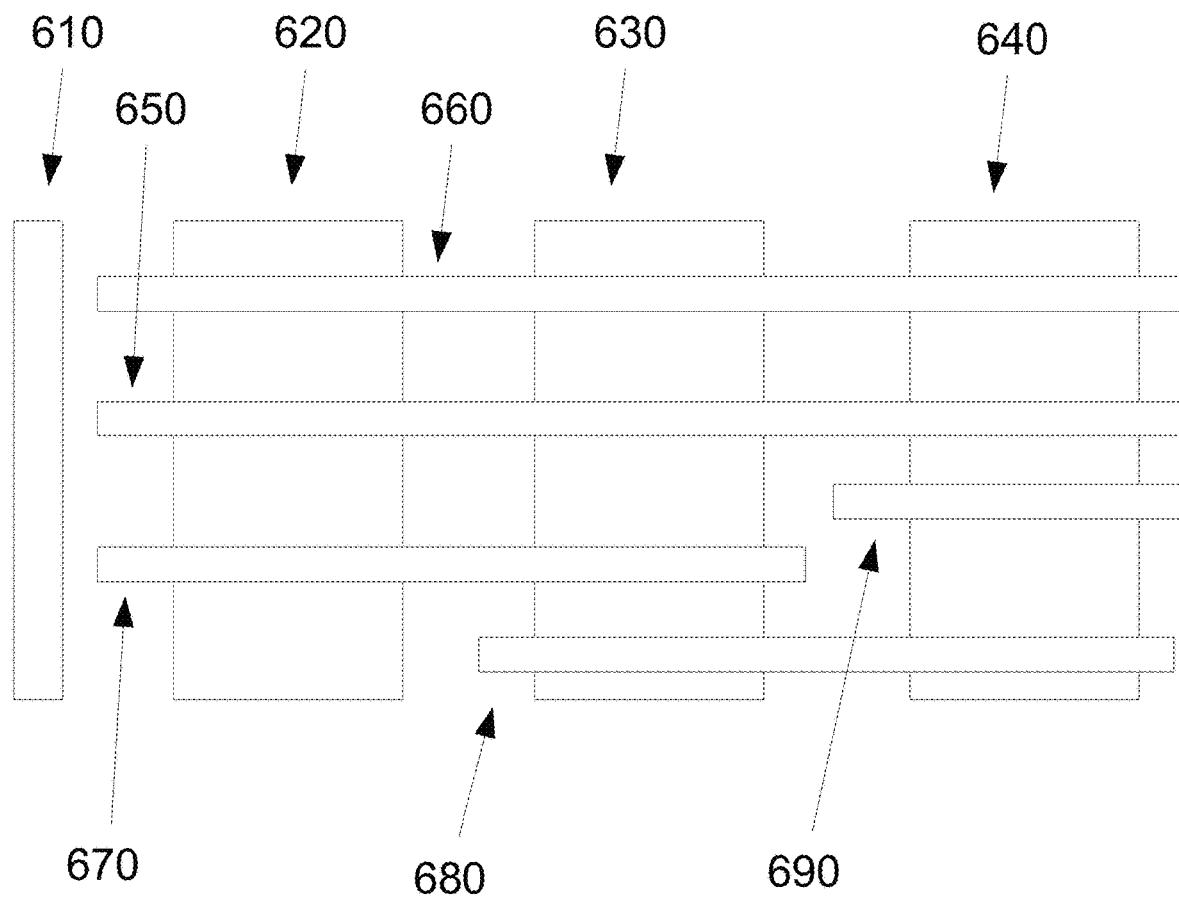
FIG. 6 is a diagrammatic representation of data paths in a network accessible system, in accordance with one embodiment.

With reference to FIG. 6, there is shown a diagrammatic representation of various data paths across networking interface 620, data processing 630, and data storage 640 components of a system. There is shown a common endpoint 610 for network traffic addressed to or sourced from the system; this may be addressable by an IP or MAC address for example. There are various data paths 660, 660, 670, 680, 690 shown across the networking/processing/data storage components. Data paths 660 and 660 are dedicated paths, each for a given class of data traffic (although they can both dedicated data paths for the same class of data traffic). Data paths 670, 680 and 690 represent sub-paths which may branch off a portion of data traffic from a given data stream depending on data characteristics of the data traffic and/or operational characteristics of any or all of the network interface 620, the data processor 630, and the data storage component 640 of the system. Data sub-path 660, for example, may be associated with data path 660 (or in some cases both 660 and 660) to provide an alternative path to and from the data storage component 640 for traffic passing over data path 660 (or path 660 as the case may be). Sub-paths 670 and 680 similarly show alternative paths for traffic over, respectively, the network interface 620 and the data processor 630, and the data processor 630 and the data storage component 640.

In embodiments, a data unit is a discrete entity of data sent via a communication. In some embodiments, a data unit may include a payload and header information; the payload may include the data that is to read or written pursuant to a data request or a data request response or it may refer to a data unit of a higher layer that is being carried by that lower-layer data unit, and the header information may refer to control information relating to the control of that data unit (such as, for example, source or destination addresses, sequence information, protocol information, checksum information and other information relating to the treatment or control of that data unit). Data units may refer to a protocol data unit (or PDU), which may or may not correlate to the data unit of the communication layer over which they are communicated. For example, a data unit may refer to any one or more of the following non-limiting list of exemplary PDUs: bit, frame, packet, segment, and/or datagram. A service data unit (or SDU) may refer the data unit that is served by layers above the layer of a particular data unit. As a purely illustrative example, an Ethernet frame, may carry as its payload, an IP packet, which in turn carries as its payload, a TCP segment, which in turn carries as its payload an application-layer data unit such pay as an NFS read request. A data unit may comprise a transaction; alternatively, it may carry one or more data transactions within its payload, or within the payload of any SDU of the data unit; in yet other cases, a single data unit may carry a portion of a data transaction wherein multiple data units are required to carry a specific data transaction. A class of data units, data, or data transactions may describe any set of zero or more of data units, data, or data transactions, as the case may be, which are related by one or more data characteristics; such characteristics may include any having the same, similar or related metadata, quality, condition, requirement, or characteristic, both extrinsic and intrinsic, including the following non-limiting examples: source address, destination address, source port, destination port, packet header information, data priority (e.g. hotness/coldness), data content, payload content, relationship to a file, object, or set of files or objects, relationship to a client or user, relationship to a network or network node, file/object type, encryption type, and requirements for additional processing (e.g. transcoding, indexing, journaling, etc.).

As used herein, a "computing device" may include virtual or physical computing device, and also refers to any device capable of receiving and/or storing and/or processing and/or providing computer readable instructions or information.

As used herein, "memory" may refer to any resource or medium that is capable of having information stored thereon and/or retrieved therefrom. Memory, as used herein, can refer to any of the components, resources, media, or combination thereof, that retain data, including what may be historically referred to as primary (or internal or main memory due to its direct link to a computer processor component), secondary (external or auxiliary as it is not always directly accessible by the computer processor component) and tertiary storage, either alone or in combination, although not limited to these characterizations. Although the term "storage" and "memory" may sometimes carry different meaning, they may in some cases be used interchangeably herein.

As used herein, a "data storage resource" may comprise a single data storage medium component or unit, or it may be different types of components that are combined logically or physically. The may include data storage medium components that provide rapid and/or temporary data storage, such as RAM (Random Access Memory), SRAM (Static Random Access Memory), DRAM (Dynamic Random Access Memory), SDRAM (Synchronous Dynamic Random Access Memory), CAM (Content-Addressable Memory), or other rapid-access memory, or more longer-term data storage that may or may not provide for rapid access, use and/or storage, such as a disk drive, flash drive, optical drive, SSD, other flash-based memory, PCM (Phase change memory) or equivalent, or combinations thereof. A data storage resource may include, in whole or in part, volatile memory devices, non-volatile memory devices, or both volatile and non-volatile memory devices acting in concert. Other forms of data storage medium components, irrespective of whether such memory technology was available at the time of filing, may be used without departing from the spirit or scope of the instant disclosure. For example, any high-throughput and low-latency storage medium can be used in the same manner as PCIe Flash, including any solid-state memory technologies that will appear on the PCIe bus. Technologies including phase-change memory (PCM), spin-torque transfer (STT) and others will more fully develop. Some data storage resources can be characterized as being high- or low-latency and/or high- or low-throughput and/or high- or low-capacity; in many embodiments, these characterizations are based on a relative comparison to other available storage resources on the same data server or within the same distributed storage system. For example, in a data server that comprises one or more PCIe Flash as well as one or more spinning disks, the PCIe flash will, relative to other storage resources, be considered as being lower latency and higher throughput, and the spinning disks will be considered as being higher latency and higher throughput. Higher or lower capacity depends on the specific capacity of each of the available storage resources, although in embodiments described herein, the form factor of a PCIe flash module is of lower capacity than a similarly sized form factor of a spinning disk. It may include a memory component, or an element or portion thereof, that is used or available to be used for information storage and retrieval.

A computing processor component refers in general to any component of a physical computing device that performs arithmetical, logical or input/output operations of the device or devices, and generally is the portion that carries out instructions for a computing device. The computing processor component may process information for a computing device on which the computing processor component resides or for other computing devices (both physical and virtual). It may also refer to one or a plurality of components that provide processing functionality of a computing processor component, and in the case of a virtual computing device, the computing processor component functionality may be distributed across multiple physical devices that are communicatively coupled. Computing processor component may alternatively be referred to herein as a CPU or a processor.

As used herein, "priority" of data generally refers to the relative "hotness" or "coldness" of data, as these terms would be understood by a person skilled in the art of the instant disclosure. The priority of data may refer herein to the degree to which data will be, or is likely to be, requested, written, or updated at the current or in an upcoming time interval. Priority may also refer to the speed which data will be required to be either returned after a read request, or written/updated after a write/update request. In some cases, a high frequency of data transactions (i.e. read, write, or update) involving the data in a given time period, the higher the priority. Alternatively, it may be used to describe any of the above states or combinations thereof. In some uses herein, as would be understood by a person skilled in the art, priority may be described as temperature or hotness. As is often used by a person skilled in the art, hot data is data of high priority and cold data is data of low priority. The use of the term "hot" may be used to describe data that is frequently used, likely to be frequently used, likely to be used soon, or must be returned, written, or updated, as applicable, with high speed; that is, the data has high priority. The term "cold" could be used to describe data that is that is infrequently used, unlikely to be frequently used, unlikely to be used soon, or need not be returned, written, updated, as applicable, with high speed; that is, the data has low priority. Priority may refer to the scheduled, likely, or predicted forward distance, as measured in time, between the current time and when the data will be called, updated, returned, written or used.

As used herein, the term client may refer to any piece of computer hardware or software that accesses a service or process made available by a server. It may refer to a computing device or computer program that, as part of its operation, relies on sending a request to another computing device or computer program (which may or may not be located on another computer or network). In some cases, web browsers are clients that connect to web servers and retrieve web pages for display; email clients retrieve email from mail servers. The term client may also be applied to computers or devices that run the client software or users that use the client software. Clients and servers may be computer programs run on the same machine and connect via inter-process communication techniques; alternatively, they may exist on separate computing devices that are communicatively coupled across a network. Clients may communicate with the data storage devices and systems described herein across physical networks which comprise the Internet. In accordance with the OSI model of computer networking, clients may be connected via a physical network of electrical, mechanical, and procedural interfaces that make up the transmission. Clients may utilize data link protocols to pass frames, or other data link protocol units, between fixed hardware addresses (e.g. MAC address) and will utilize various protocols, including but not limited to Ethernet, Frame Relay, Point-to-Point Protocol. Clients may also communicate in accordance with packetized abstractions, such as the Internet Protocol (IPv4 or IPv6) or other network layer protocols, including but not limited to Inter-network Packet Exchange (IPX), Routing Information Protocol (RIP), and Datagram Delivery Protocol (DDP). Next, end-to-end transport layer communication protocols may be utilized by certain clients without departing from the scope of the instant disclosure (such protocols may include but not limited to the following: AppleTalk Transaction Protocol ("ATP"), Cyclic UDP ("CUDP"), Datagram Congestion Control Protocol ("DCCP"), Fibre Channel Protocol ("FCP"), IL Protocol ("IL"), Multipath TCP ("MTCP"), NetBIOS Frames protocol ("NBF"), NetBIOS over TCP/IP ("NBT"), Reliable Datagram Protocol ("RDP"), Reliable User Datagram Protocol ("RUDP"), Stream Control Transmission Protocol ("SCTP"), Sequenced Packet Exchange ("SPX"), Structured Stream Transport ("SST"), Transmission Control Protocol ("TCP"), User Datagram Protocol ("UDP"), UDP Lite, Micro Transport Protocol ("µTP"). Such transport layer communication protocols may be used to transport session, presentation- or application-level data. Some application-level data, including RPC and NFS, among many others which would be known to a person skilled in the art. Network communication may also be described in terms of the TCP/IP model of network infrastructure; that is, the link layer, Internet layer, transport layer, and application layer. In general, applications or computing devices that request data from a server or data host may be referred to as a client. In some cases, a client and the entity that is utilizing the client may jointly be referred to as a client; in some cases, the entity utilizing the client is a human and in some cases it may be another computing device or a software routine.

As used herein, "latency" of memory resources may be used to refer to a measure of the amount of time passing between the time that a storage resource or server receives a request and the time at which the same storage resource or server responds to the request.

As used herein, "throughput" of memory resources refers to the number of input/output operations per second that a storage resource or server can perform. Typically, this measurement used is "IOPS" but other measurements are possible, as would be known to a person skilled in the art.

As used herein, a "data transaction" may refer to any instructions or requests relating to the reading, writing, updating, and/or calling of data; and such data transactions may comprise of (i) data requests, generally issued by data clients or by entities requesting an action be taken with specific data (e.g. read, write, update), as well as (ii) data responses, generally returned by data servers (including the data storage devices and systems described herein) in response to a data request. In embodiments, data requests originate at data clients; in embodiments, they may originate from applications running on or at a data client. In embodiments, data requests are sent to data servers and then responded to appropriately, and a response is returned to the data client. In embodiments, data requests may be asymmetrical in that a write request generally carries a relatively large amount of data from data client to the distributed data storage system, since it must include the data to be written, and the data storage system returns a relatively much smaller response that acknowledges receipt and confirms that the data was written to memory; in embodiments, a read request is relatively small amount of data, whereas the response to the read request from the data storage system is the data that was read and is therefore much larger than the request, relatively speaking. In some cases, incoming queues may be populated by data requests and outgoing queues may be populated by data responses; whether or not such queue is incoming or outgoing, dedicated processing and storage resources having different performance characteristics and capabilities may be associated therewith in accordance with the subject matter described herein. Data requests are often made in accordance with an application or session layer abstraction; in embodiments, they are instructions from one computing device (or other endpoint) to implement an action or a subroutine at another computing device. In embodiments, data requests are sent over the network as NFS requests (application layer) contained within TCP segments (endpoint-to-endpoint data stream) which in turn are carried in IP packets over the Internet, across Ethernet-based devices within frames across networking devices. Other exemplary data requests may form RPC (Remote Procedure Call) requests, which may in turn comprise NFS requests or other types of data requests. Other examples include iSCSI, SMB, Fibre Channel, FAT, NTFS, RFS, as well as any other file system requests and responses which would be known to persons skilled in the art of the instant disclosure. In embodiments utilizing NFS, an NFS request and its corresponding response, would each be considered a data transaction.

Typical computing servers may include, but not be limited to, a database server, file server, mail server, print server, web server, gaming server, application server, or some other kind of server. Nodes in embodiments of the instant disclosure may be referred to as servers. Servers may comprise one or more storage resources thereon, and may include one or more different types of data storage resource. In embodiments of the distributed storage systems disclosed herein, storage resources are provided by one or more servers which operate as data servers. The one or more data servers may be presented to clients as a single logical unit, and in some embodiments will share the same IP address; data communication with such one or more groups can share a single distributed data stack (such as TCP, but other transport layer data streams or communication means are possible, and indeed data stacks in different OSI or TCP/IP layers can be used). In some cases, the servers will jointly manage the distributed data stack; in other cases, the distributed data stack will be handled by the switch; and in yet other cases a combination of the switch and the one or more servers will cooperate to handle the distributed data stack.

In embodiments, client applications communicate with data servers to access data resources in accordance with any of a number of application-level storage protocols, including but not limited to Network File System ("NFS"), Internet Small Computer System Interface ("iSCSI"), and Fiber Channel. Other storage protocols known to persons skilled in the art pertaining hereto may be used without departing from the scope of the instant disclosure. Additionally, object storage interfaces such as Amazon's S3, analytics-specific file systems such as Hadoop's HDFS, and NoSQL stores like Mongo, Cassandra, and Riak are also supported by embodiments herein. Second, 10 GB interfaces became commonplace on servers on servers, and Ethernet switches inherited "software defined" capabilities including support for Open-Flow.

While the present disclosure describes various exemplary embodiments, the disclosure is not so limited. To the contrary, the disclosure is intended to cover various modifications and equivalent arrangements included within the general scope of the present disclosure.

What is claimed is:

1. A resource allocation system, comprising:
   a network interface in data communication with a network;
   a plurality of data queues in communication with the network interface, the plurality of data queues configured to receive and send data units;
   a data storage component in communication with the network interface and the plurality of data queues, the data storage component comprising a plurality of different types of data storage resources for receiving and responding to data transactions communicated by data units from specifically assigned data queues of the plurality of data queues; and
   a queue mapping component in communication with the plurality of data queues, the network interface, and the data storage component, wherein the queue mapping component is configured to:
      identify at least one data unit characteristic from the data units, where the at least one data unit characteristic indicates a temporal relationship between data units,
      assign data units having a shared at least one data unit characteristic to a same queue of the plurality of data queues,
      dynamically allocate the same queue to two or more data storage resources, of the plurality of different types of data storage resources, based on the temporal relationship, and
      transmit the data units to the dynamically allocated same queue.

2. The resource allocation system of claim 1, wherein the plurality of data storage resources each comprise at least one of the following:
   at least one data storage media component, and
   at least one data transaction queue of one of the at least one data storage media component.

3. The resource allocation system of claim 2, wherein each of the at least one data storage media component comprises one of the following:
   a flash memory device, a spinning disk, and a solid state drive.

4. The resource allocation system of claim 3, wherein the at least one spinning disk is presented as one or more data transaction queues by a disk aggregation software tool.

5. The resource allocation system of claim 2, further comprising:
   one or more processing resources, each processing resource assignable to one or more of the plurality of network data queues.

6. The resource allocation system of claim 1, wherein the at least one data unit characteristic comprises at least one of the following:
   a source IP address, a destination IP address, a destination port, a packet header information, and a data priority.

7. The resource allocation system of claim 1, wherein the queue mapping component maps network queues with plurality of data storage resource to meet a service requirement criteria.

8. The resource allocation system of claim 7, wherein the service requirement criteria comprises at least one of the following:
   a service quality requirement and a service type requirement.

9. The resource allocation system of claim 8, wherein the service quality requirement comprises one of the following:
   information about maintaining data transaction request latency below a first latency threshold, information about maintaining data transaction request latency above a second latency threshold, information about maintaining data transaction request throughput below a first throughput rate threshold, and information about maintaining data transaction request throughput above a second throughput rate threshold.

10. The resource allocation system of claim 8, wherein the service type requirement comprises at least one of the following services specific to at least one network data queue:

an encryption service, a translation service, an integrity checking service, and a redundancy service.

11. The resource allocation system of claim 1, further comprising:

one or more processing resources, wherein the queue mapping component is further configured to:

map connections between one or more processing resources and the network data queues and the data storage resources.

12. The resource allocation system of claim 11, wherein a particular connection of the plurality of data queues, the one or more processing resources, and the one or more data storage resources is assignable for the data units based on the at least one data unit characteristic.

13. The resource allocation system of claim 12, wherein the particular connection can be reassigned to at least some of the data units depending on operational characteristics of the at least one of the more data queues, the one or more processing resources, and the one or more data storage resources.

* * * * *